(12) United States Patent
Wanweerakul

(10) Patent No.: US 9,057,457 B2
(45) Date of Patent: Jun. 16, 2015

(54) DRAIN HOSE CLIP FOR A WASHER

(75) Inventor: Napat Wanweerakul, Trent Woods, NC (US)

(73) Assignee: BSH Home Appliances Corporation, Irvine, CA (US)

( * ) Notice: Subject to any disclaimer, the term of this patent is extended or adjusted under 35 U.S.C. 154(b) by 1086 days.

(21) Appl. No.: 13/080,873

(22) Filed: Apr. 6, 2011

(65) Prior Publication Data
US 2012/0255330 A1  Oct. 11, 2012

(51) Int. Cl.
*F16L 5/00* (2006.01)
*D06F 39/08* (2006.01)
*A47L 15/42* (2006.01)

(52) U.S. Cl.
CPC .............. *F16L 5/00* (2013.01); *A47L 15/4214* (2013.01); *A47L 15/4223* (2013.01); *D06F 39/083* (2013.01)

(58) Field of Classification Search
CPC ..... D06F 39/083; F16L 5/00; A47L 15/4214; A47L 15/4223
USPC .............. 68/207, 208; 248/74.1, 75, 65, 74.2, 248/230.1, 230.3, 230.5, 231.41, 231.61, 248/231.85
See application file for complete search history.

(56) References Cited

U.S. PATENT DOCUMENTS

| | | | | |
|---|---|---|---|---|
| 2,534,690 A * | 12/1950 | Young, Jr. et al. | ........... | 248/68.1 |
| 4,860,791 A * | 8/1989 | Putnam | ..................... | 137/565.01 |
| 4,870,988 A * | 10/1989 | Hood et al. | ..................... | 137/343 |
| 5,311,753 A | 5/1994 | Kanao | | |
| 5,312,138 A | 5/1994 | Patera et al. | | |
| 5,526,619 A * | 6/1996 | Vagedes | ........................ | 52/220.1 |
| 5,582,199 A * | 12/1996 | Schmidt et al. | ................ | 137/360 |
| 5,704,401 A | 1/1998 | Fukui et al. | | |
| 5,820,168 A * | 10/1998 | De Giacomoni | .............. | 285/192 |
| 6,009,909 A | 1/2000 | Mantua et al. | | |
| 6,223,777 B1 | 5/2001 | Smith et al. | | |
| 6,311,936 B1* | 11/2001 | Herr et al. | ......................... | 248/75 |
| 7,077,166 B2 | 7/2006 | Heo et al. | | |
| 7,597,119 B2 | 10/2009 | Boettner | | |
| 8,474,878 B2 * | 7/2013 | Richter | .......................... | 285/320 |
| 2007/0101774 A1* | 5/2007 | Lee | ................................. | 68/208 |
| 2009/0266427 A1* | 10/2009 | Haltmayer et al. | ........... | 137/343 |
| 2009/0301593 A1 | 12/2009 | Zucchi et al. | | |

FOREIGN PATENT DOCUMENTS

DE        202005019175 U1 *  6/2006  .............. D06F 39/00

* cited by examiner

*Primary Examiner* — Joseph L Perrin
(74) *Attorney, Agent, or Firm* — James E. Howard; Andre Pallapies

(57) ABSTRACT

A drain hose clip for securing a drain hose to a household appliance, and a household appliance having the drain hose clip and drain hose. The drain hose clip includes a body configured to be coupled to the drain hose and to secure the drain hose to the household appliance, and an orientation control feature on the body that engages a corresponding orientation control feature on the drain hose to maintain a fixed position of the drain hose with respect to the body of the drain hose clip.

36 Claims, 19 Drawing Sheets

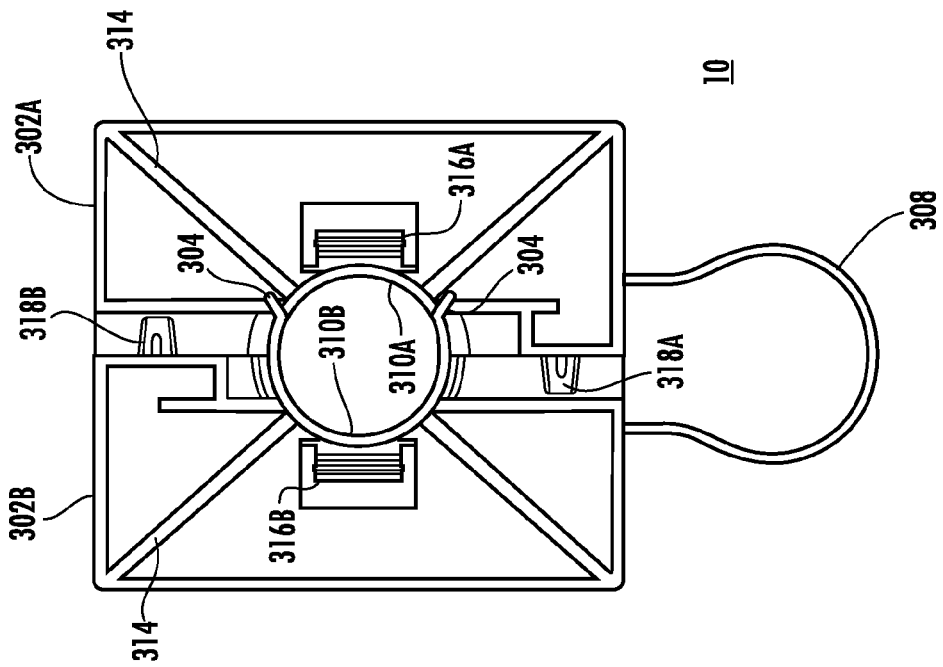
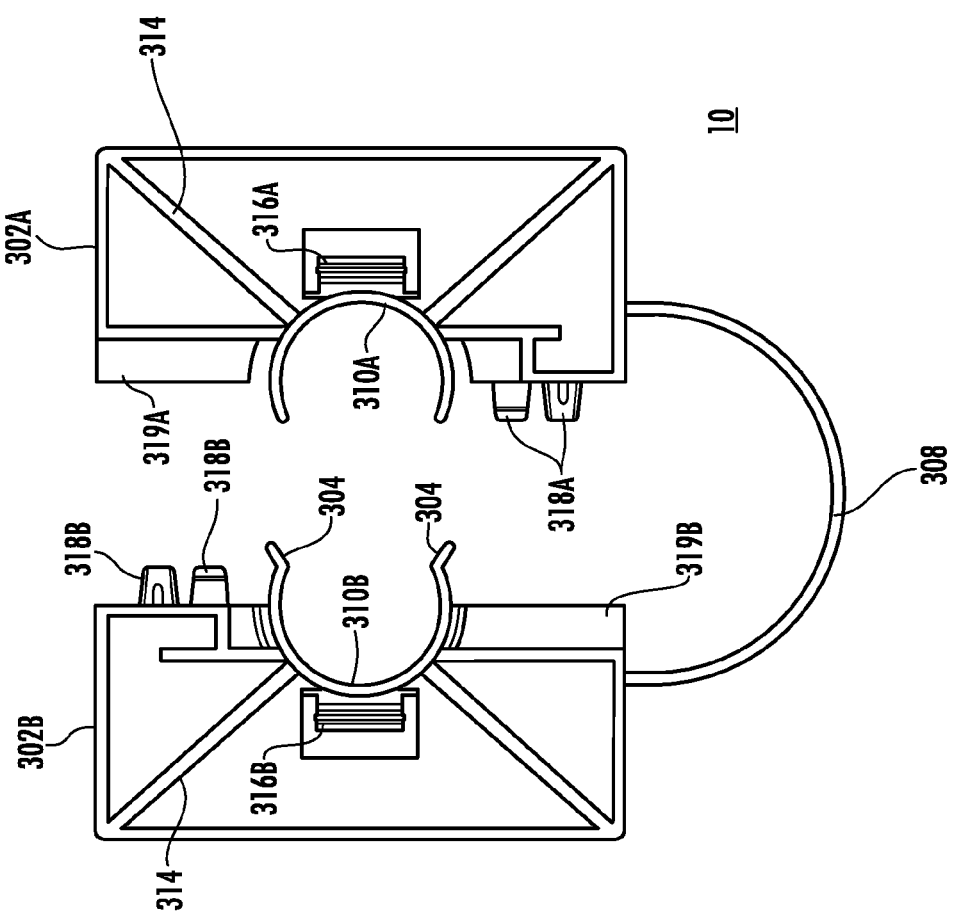
FIG. 3B
FIG. 3A

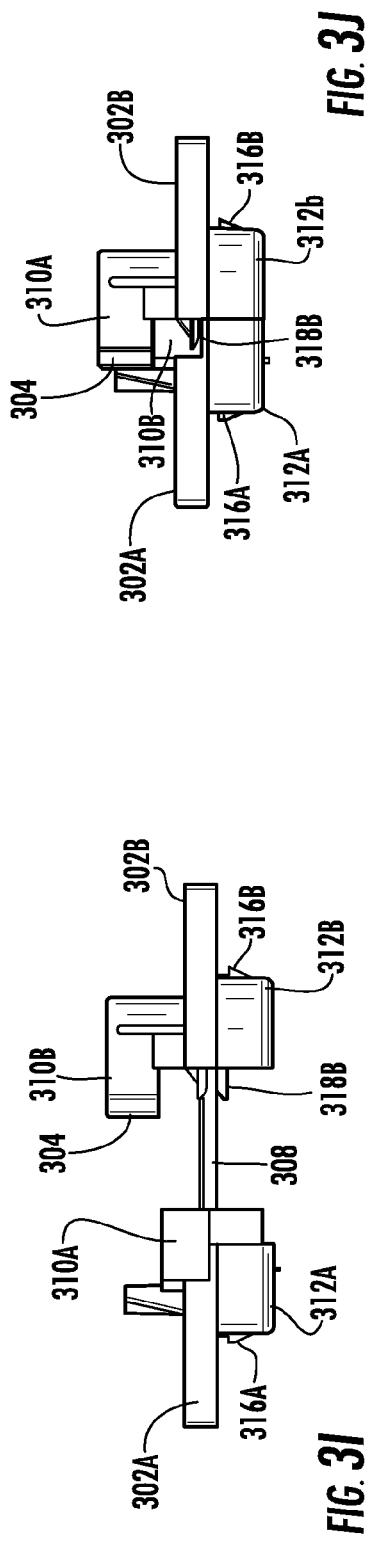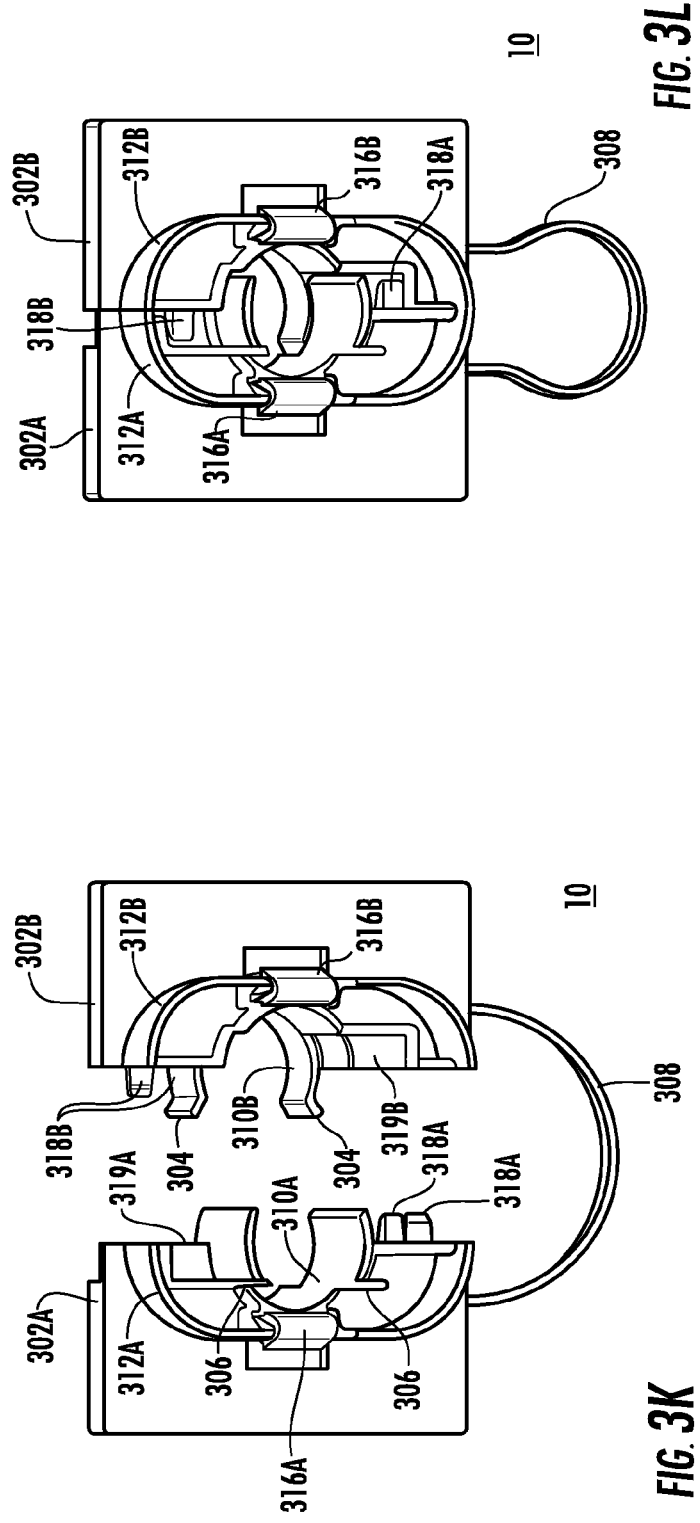

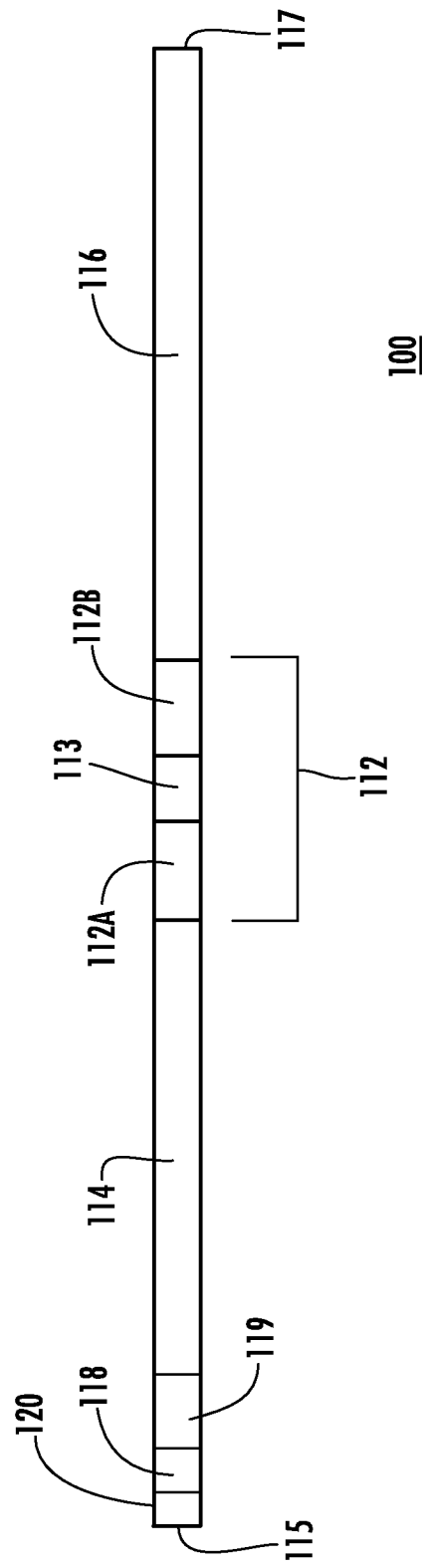

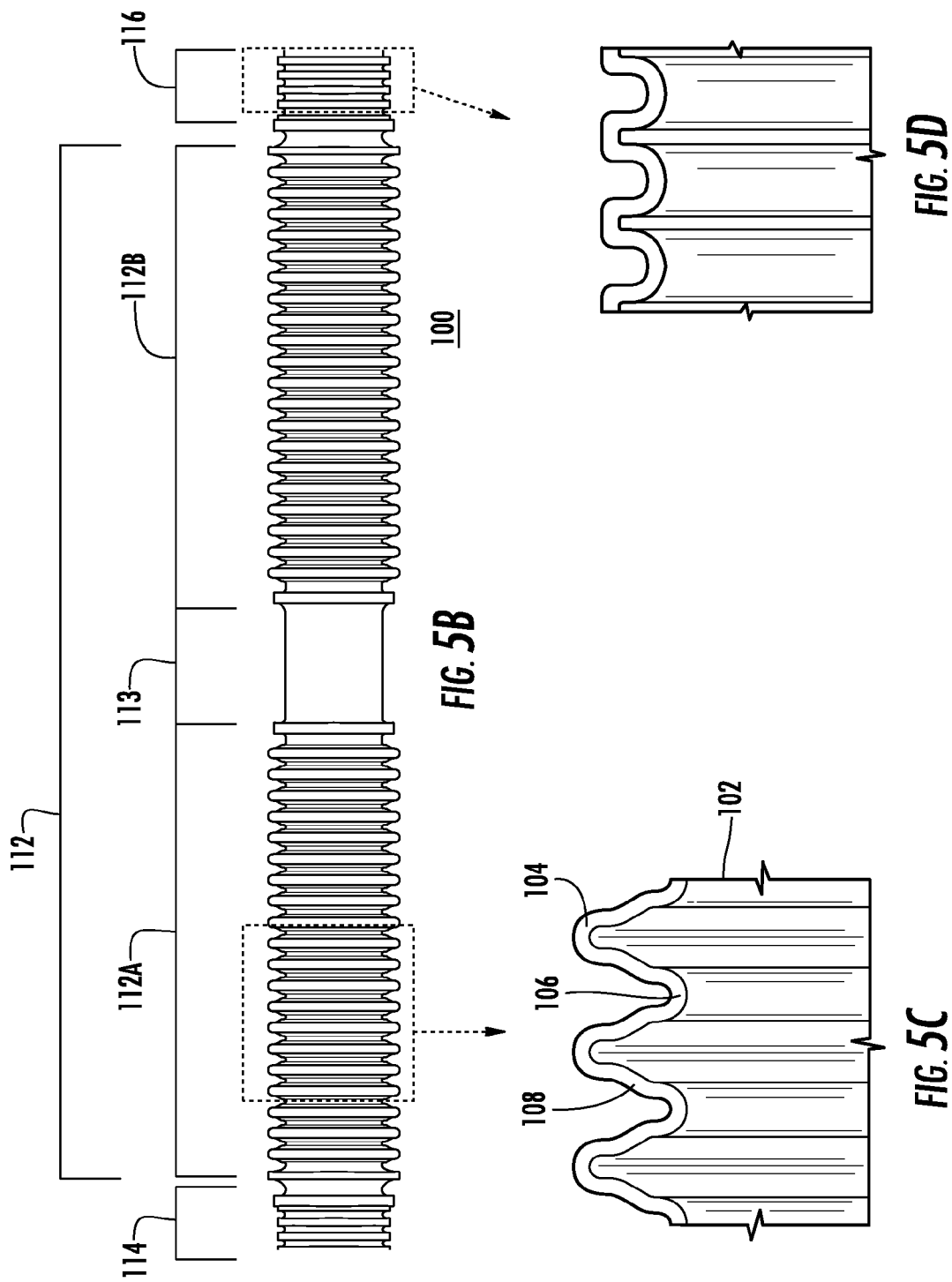

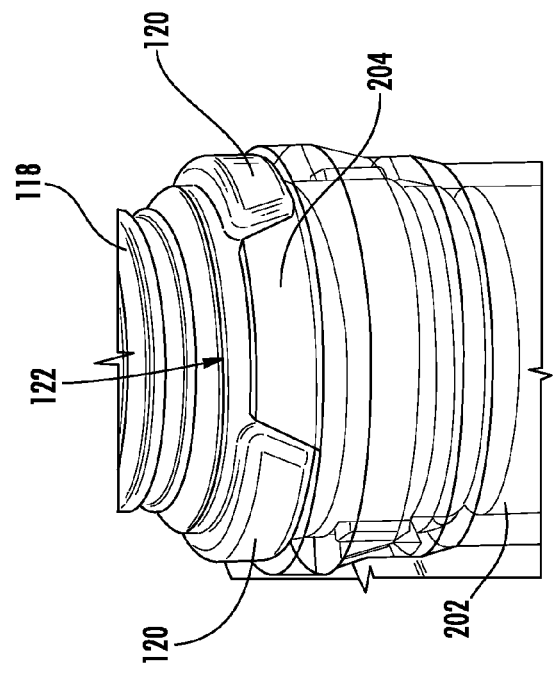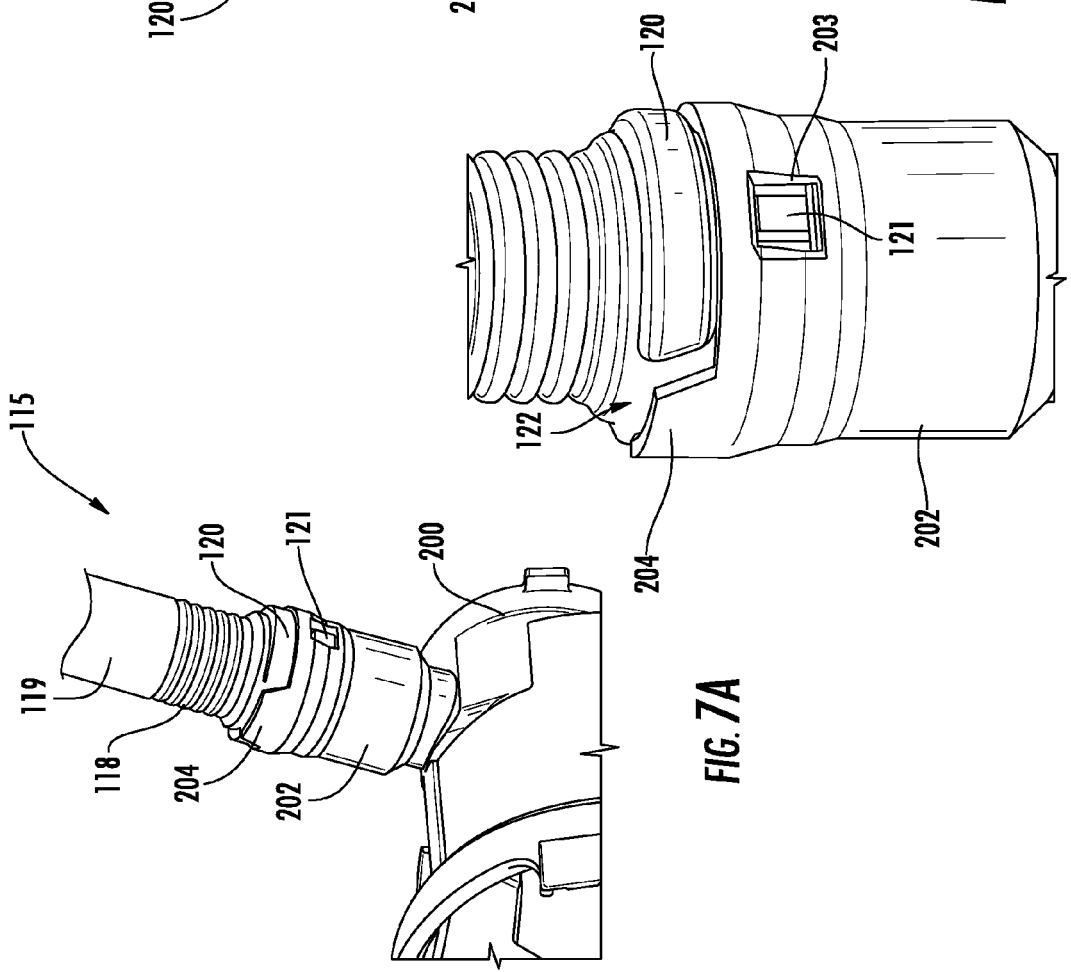
FIG. 7B
FIG. 7C
FIG. 7A

DRAIN HOSE CLIP FOR A WASHER

CROSS-REFERENCE TO RELATED APPLICATIONS

This application is related to applicant's co-pending U.S. application Ser. No. 13/080,871, which is filed concurrently herewith, titled "DRAIN HOSE FOR A WASHER", which is incorporated herein by reference in its entirety.

FIELD OF THE INVENTION

The present invention is directed to a drain hose clip for a drain hose of a household appliance and a household appliance having a drain hose clip, and more particularly, to a drain hose clip including an orientation control feature for a drain hose of a household appliance, and a household appliance having a drain hose clip including such an orientation control feature.

BACKGROUND OF THE INVENTION

A household appliance, such as a front-loading clothes washer, includes a housing supported by a structure, such as a floor. A door provides access to a washing unit in the interior of the appliance housing. The washing unit includes a tub having a cylindrical washing drum rotatably mounted inside the tub. In operation, clothes or laundry are inserted into the washer through the door and placed in the rotating washing drum inside the tub. The household appliance wets the laundry to be washed with washing liquid and mechanically moves the laundry to release contaminants from the laundry. A drive system rotates the washing drum inside the tub about an axis of the drum. The washer can remove dirt from laundry with washing, rinsing, and spinning cycles using detergent and water. The washer commonly includes a drain pump for pumping out washing or rinsing liquid from the tub to an exterior (e.g., an external drain facility), and a drain hose that connects the drain pump and the external drain facility, such as a drain pipe, for discharging the washing or rinsing liquid pumped by the drain pump to the exterior.

In the past, conventional drain hose assemblies commonly have included two individual drain hoses, one plastic connector, and two hose clamps. These conventional systems commonly require pre-assembly of an internal (first) drain hose to a first side of a plastic connector with a first metal clamp. The plastic connector can be attached to or extend through the rear panel of the washer. An external (second) drain hose is attached to the other side (second or external side) of the plastic connector with a second metal clamp. The installation of such a conventional drain hose assembly can be burdensome, time consuming, and costly.

Recently, a longer, continuous one-piece drain hose has been provided to reduce the total number of components and fittings in the draining system, instead of providing two, smaller drain hoses coupled to a plastic connector. The continuous one-piece drain hose is extended through an opening or cutout in the rear panel of the washer such that one end of the drain hose can be connected to an external drain facility and another end of the drain hose can be connected to the drain pump within the appliance.

In some appliances, the drain pump may be located in the rear lower portion of the appliance and close to the opening or cutout in the rear of the appliance. In other appliances, the drain pump may be located in the front lower portion of the appliance to facilitate easy access to the drain pump for maintenance or removal/replacement. In these cases, the drain hose commonly will be fed or inserted through an opening or cutout in the rear panel of the appliance (e.g., at an upper portion of the rear panel), and then along the interior of the side panel of the appliance to the drain pump in the front lower portion of the appliance. The internal clearance within the housing of the washer for routing the drain hose may be limited or restricted depending on the particular arrangement of the drain pump, drain hose, and other components of the washer. Thus, one or more portions of the drain hose commonly must be bent by, for example, 90~180 degrees from its original straight shape. Additionally, the packaging materials used to protect and ship the washer from the manufacturer to the customer may provide limited or restricted clearance on the outside of the washer housing for routing the portion of the drain hose that extends from the rear panel of the washer housing. Thus, another portion of the drain hose that is outside of the housing of the washer commonly must be bent in an arch shape by, for example, 90~180 degrees from its original straight shape in order to avoid interference with the packing materials used to protect and transport the washer from the manufacturer to the customer. In order to facilitate the bending of the drain hose, the conventional continuous drain hose commonly is formed from a corrugated plastic hose pattern having a wave pattern or a spiral pattern that may be formed by casting or molding.

SUMMARY OF THE INVENTION

The present invention recognizes that during the assembly process the drain hose commonly will be assembled to the rear panel of the appliance at one station (i.e., a rear panel station) of the assembly line, and assembled to the drain pump at another station (i.e., pump station) of the assembly line. At the rear panel station, an operator commonly will work from the rear of the appliance and in an area close to the top portion of the rear panel of the appliance for assembly tasks. At the pump station, an operator commonly will work from the front of the appliance and in an area close to the bottom portion of the front panel of the appliance for assembly tasks. Since the operator at the pump station is working from the front of the appliance, this operator cannot reach or access very far into the interior of the appliance to work on any assemblies in the rear area of the appliance. As a result of this and the longer length of the continuous one-piece drain hose, the drain hose commonly will be fed or inserted through the opening or cutout in the rear panel of the appliance (e.g., at an upper portion of the rear panel) by the operator at the rear panel station on the assembly line and prior to the appliance arriving at the pump station of the assembly line. The drain hose commonly is fed from the rear of the appliance toward the front of the appliance along the interior of the side panel of the appliance in a space between the oscillating system (e.g., tub/drum assembly and damping/suspension system) and the inside of the side panel of the appliance.

At the pump station, the operator will then connect the end of the continuous drain hose to the drain pump. The drain pump and drain hose commonly may include a poka-yoke assembly to ensure that the drain hose only can be oriented and assembled to the fitting of the drain pump in a single correct position, thereby eliminating or reducing assembly errors. The drain hose may include, for example, an end ring portion having an opening portion that must be aligned with a corresponding projection or key portion on the fitting of the drain pump and/or lock tabs that must be aligned with corresponding cutouts on the fitting of the drain pump to facilitate connection of the drain hose to the fitting of the drain pump, thereby ensuring a correct assembly of the drain hose to the drain pump by the operator.

If the drain hose is not positioned or aligned correctly when it is inserted through the rear panel of the appliance, the orientation features on the end of the drain hose may be misaligned with the corresponding orientation features on the fitting of the drain pump. As a result, the operator at the drain pump station may need to force, bend, or twist the drain hose to align the opening and/or tab features of the drain hose with the corresponding key and/or cutout features of the fitting of the drain pump in order to assemble the drain hose to the drain pump. The action of forcing, bending, or twisting the drain hose into the correct position may result in the drain hose being kinked, or in the formation of stress marks or cracks, for example, on the ridges or troughs of the corrugated drain hose. The action of forcing, bending, or twisting the drain hose also may cause the drain hose to be disoriented or to spring out of position within the limited space in the interior of the appliance such that portions of the drain hose may come into contact with other components of the appliance, such as the oscillating system. This may result, for example, in an increase in noise or vibration during operation of the appliance, an increase in wear on the drain hose during operation of the appliance, interference with the proper operation of the oscillating system, or other damage or accelerated wear to the drain hose or appliance.

The present invention also recognizes that the action of bending of the drain hose during the assembly process, packaging, or shipping of the appliance in order to avoid interference with internal components of the appliance or the packing materials used to protect and transport the appliance from the manufacturer to the customer may cause the position of the drain hose to change. The change in position of the drain hose may cause the drain hose to be disoriented or to spring out of position within the limited space in the interior of the appliance such that portions of the drain hose may come into contact with other components of the appliance, such as the oscillating system. As explained above, this may result, for example, in an increase in noise or vibration during operation of the appliance, an increase in wear on the drain hose during operation of the appliance, interference with the proper operation of the oscillating system, or other damage or accelerated wear to the drain hose or the appliance.

These problems and others are addressed by the present invention, which provides exemplary embodiments of a drain hose clip having an orientation control feature that controls and maintains the correct alignment of the drain hose for assembly with the drain pump by the operator at the subsequent pump station of the assembly line. In this manner, the drain hose clip according to the invention can reduce or prevent any need for the operator to force, twist, or bend the drain hose into correct alignment with the drain pump, thereby reducing or preventing damage to the drain hose, such as kinking, stress marks or cracks, or other damage or accelerated wear resulting from portions of the drain hose being moved into, or springing into, contact with internal components of the appliance, such as the oscillating system of the appliance.

The exemplary drain hose clip also can include a securing feature that ensures that the drain hose is easily and efficiently secured and fixedly aligned with the opening or cutout in the rear panel of the appliance. In this manner, the drain hose clip according to the invention can reduce or prevent misalignment of the drain hose resulting, for example, from bending of the drain hose during the assembly, packaging, or shipping processes, thereby reducing or preventing misalignment, accelerated wear, or damage to the drain hose.

The drain hose clip can control the orientation of the drain hose and the drain hose clip with respect to each other, as well as to the opening or cutout in the rear panel of the washer housing. The drain hose clip also can reduce or prevent movement of the drain hose into and out of the opening in the rear panel of the washer housing, thereby reducing or preventing damage from the drain hose rubbing against the housing or the opening of the housing.

A first exemplary embodiment comprises a drain hose clip for securing a drain hose to a household appliance, the drain hose clip including a body configured to be coupled to the drain hose and to secure the drain hose to the household appliance; and an orientation control feature on the body that engages a corresponding orientation control feature on the drain hose to maintain a fixed position of the drain hose with respect to the body of the drain hose clip.

Another exemplary embodiment of the invention comprises a household appliance, such as a washer, including a housing having a front panel and a rear panel, the housing having a door formed in the front panel for accessing an interior of the housing, the housing having a cutout in the rear panel; a tub disposed inside the housing; a rotatable drum within the tub, the rotatable drum for receiving laundry through the door; a drain pump disposed inside the housing; a continuous drain hose having a first open end coupled to the drain pump and a second open end disposed outside of the housing, wherein the drain hose extends through the cutout in the rear panel; and a drain hose clip for securing the drain hose to the household appliance, the drain hose clip including a body configured to be coupled to the drain hose and to secure the drain hose to the household appliance; and an orientation control feature on the body that engages a corresponding orientation control feature on the drain hose to maintain a fixed position of the drain hose with respect to the body of the drain hose clip, wherein the drain hose clip engages the drain hose and the cutout in the rear panel to secure the drain hose to the cutout and control an orientation of the drain hose with respect to the drain pump.

In an embodiment, the opening or cutout of the rear panel forms a fitting support for securing the drain hose clip to the rear panel, and the drain hose clip is secured to the fitting support. The straight portion of the drain hose can include a mating surface engaging the drain hose clip to secure the drain hose to the cutout of the rear panel and to maintain the position of the drain hose with respect to the cutout of the rear panel. For example, the drain hose clip can include an orientation control feature and the straight portion of the drain hose can include a corresponding orientation control feature, such that the orientation control feature of the drain hose clip engages the orientation control feature of the drain hose to provide a predetermined orientation of the drain hose with respect to the drain hose clip, which thereby provides a predetermined orientation with respect to the cutout of the rear panel of the household appliance.

The orientation control features can be configured such that there is only a single way to connect the drain hose clip to the drain hose, thereby further ensuring that the drain hose clip is properly orientated with respect to the drain hose and the rear panel of the washer housing.

An exemplary method of installing a drain hose can include a step of feeding the drain hose from the outside of the washer through an opening or cutout on the rear panel of the appliance, for example, at a rear panel station of the assembly line. Next, a drain hose clip according to the exemplary embodiments of the invention can be coupled to the drain hose, for example by snap-fitting the drain hose clip to the drain hose at the straight portion of the drain hose. The orientation features on the drain hose clip and the drain hose can ensure that the drain hose will be oriented properly for correct installation on the pump housing of the drain pump. The drain hose clip then can be aligned with the cutout or opening in the rear panel of the housing and pushed into the opening in the housing until the drain hose clip snaps and locks in place. The drain hose clip can be configured to be inserted into the opening in the housing, for example, from the interior side of the housing or the exterior side of the housing, or in other embodiments, from both the interior and exterior side of the housing, for example, if the drain hose clip is formed from separate pieces. The drain hose clip can control and maintain the correct alignment of the drain hose for assembly with the drain pump by the operator at the subsequent pump station of the assembly line, thereby reducing or preventing any need for the operator at the pump station to force, twist, or bend the drain hose into correct alignment with the drain pump. The drain hose clip also can reduce or prevent damage to the drain hose, such as kinking, stress marks or cracks, or other damage or accelerated wear resulting from portions of the drain hose being moved into, or springing into, contact with internal components of the appliance, such as the oscillating system of the appliance.

In this manner, an operator at a subsequent pump station of the assembly line then can easily and efficiently connect the end of the continuous drain hose to the drain pump without having to force, twist, or bend the drain hose into correct alignment with the fitting of the drain pump (for example, to align the opening and/or tab features of the drain hose with the corresponding key and/or cutout features of the fitting of the drain pump in order to assemble the drain hose to the drain pump). The correct alignment of the drain pump and drain hose can simplify the use of a poka-yoke assembly for ensuring that the drain hose only can be oriented and assembled to the fitting of the drain pump in a single correct position, thereby eliminating or reducing assembly errors.

The portion of the drain hose within the appliance also can be secured to the inside of the rear panel of the housing by, for example, a side panel clip to further ensure that the drain hose does not contact or interfere with internal components of the appliance, such as the oscillating system. The portion of the drain hose outside of the appliance can be routed and secured to the exterior surface of the rear panel of the housing at a second location using another hose clip and/or hose support to take up the remaining length of drain hose. The drain hose can remain in this secured state during packaging and shipping to prevent damage to the drain hose. After the washer is delivered to a user and the packaging is removed, the consumer simply can remove the hose from the hose support and position the second open end (distal end) of the hose into an external drain pipe to complete the installation of the drain hose.

The exemplary embodiments also can provide a continuous, one-piece drain hose and drain hose clip assembly that ensures that the first open end of the drain hose is properly aligned and oriented with the drain pump in the washer, while also ensuring that the drain hose is properly aligned and oriented with the fitting support, and properly aligned and oriented for insertion into a drain pipe located exterior to the washer. The exemplary assembly can control the orientation of the drain hose and the drain hose clip with respect to each other, as well as to the opening in the rear panel of the washer housing, and reduce or prevent movement of the drain hose into and out of the opening in the rear panel of the washer housing, thereby reducing or preventing damage from the drain hose rubbing against the housing or the opening of the housing.

Another exemplary embodiment can include a drain hose clip for securing a drain hose to a household appliance, the drain hose clip including a body configured to be coupled to the drain hose and to secure the drain hose to the household appliance; orientation control means for engaging a corresponding orientation control feature on the drain hose and maintaining a fixed position of the drain hose with respect to the body of the drain hose clip; and securing means for securing the drain hose clip to the household appliance.

Another exemplary embodiment can include a household appliance including a housing having a front panel and a rear panel, the housing having a door formed in the front panel for accessing an interior of the housing, the housing having a cutout in the rear panel; a tub disposed inside the housing; a rotatable drum within the tub, the rotatable drum for receiving laundry through the door; a drain pump disposed inside the housing; a continuous drain hose having a first open end coupled to the drain pump and a second open end disposed outside of the housing, wherein the drain hose extends through the cutout in the rear panel; and a drain hose clip including a body configured to be coupled to the drain hose and to secure the drain hose to the household appliance; orientation control means for engaging a corresponding orientation control feature on the drain hose to maintain a fixed position of the drain hose with respect to the body of the drain hose clip; and securing means for securing the drain hose clip to the household appliance, wherein the drain hose clip engages the drain hose and the cutout in the rear panel to secure the drain hose to the cutout and control an orientation of the drain hose with respect to the drain pump.

Other features and advantages of the present invention will become apparent to those skilled in the art upon review of the following detailed description and drawings.

BRIEF DESCRIPTION OF THE DRAWINGS

These and other aspects and features of embodiments of the present invention will be better understood after a reading of the following detailed description, together with the attached drawings, wherein:

FIG. 3A is a front view of a drain hose clip according to another exemplary embodiment of the invention in an uncoupled state.

FIG. 3B is a front view of the drain hose clip of FIG. 3A in a coupled state.

FIG. 3I is a top view of the drain hose clip of FIG. 3E in an uncoupled state.

FIG. 3J is a top view of the drain hose clip of FIG. 3F in a coupled state.

FIG. 3K is a top perspective, rear view of the drain hose clip of FIG. 3E in an uncoupled state.

FIG. 3L is a perspective rear view of the drain hose clip of FIG. 3F in a coupled state.

FIG. 5A is a schematic side view of a drain hose according to an exemplary embodiment of the invention.

FIG. 5B is a partial side view of the drain hose of FIG. 5A.

FIG. 5C is a partial side, cross-sectional view of a flex-section of the drain hose of FIG. 5A.

FIG. 5D is a partial side, cross-sectional view of a normal corrugated section of the drain hose of FIG. 5A.

FIG. 7A is a partial perspective view of a drain pump of a washer and a first open end of the drain hose according to an exemplary embodiment of the invention.

FIG. 7B is a partial side perspective view of the drain pump and the first open end of the drain hose of FIG. 7A.

FIG. 7C is another partial side perspective view of the drain pump and the first open end of the drain hose of FIG. 7A.

DETAILED DESCRIPTION OF THE EXEMPLARY EMBODIMENTS OF THE INVENTION

Figure 1C:
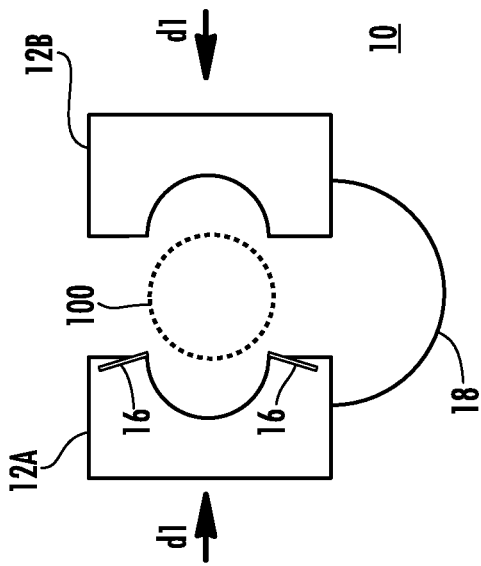
FIG. 1C is a schematic rear view of the drain hose clip of FIG. 1A.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Referring now to the drawings, FIGS. 1A-18 illustrate exemplary embodiments of a drain hose clip and a household appliance, such as a washer, having a drain hose and a drain hose clip.

Exemplary embodiments of a drain hose clip 10 will now be described with reference to FIGS. 1A-3L.

An exemplary embodiment of the drain hose clip 10 can include a first portion 12A and a second portion 12B that engage each other to form the drain hose clip 10. For example, the first portion 12A and second portion 12B can be coupled around (e.g., wrapped around) a drain hose 100 without having to insert the length of the drain hose 100 through an opening formed by the drain hose clip 10. The first portion 12A and second portion 12B can be separate parts, or the first portion 12A and second portion 12B can be moveably coupled together.

Figure 1B:
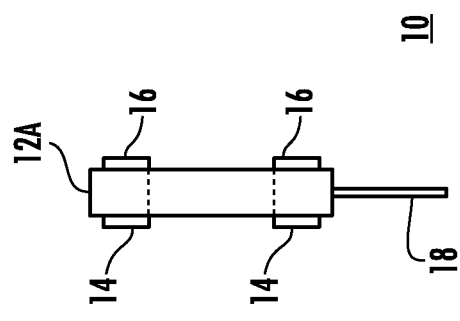
FIG. 1B is a schematic side view of the drain hose clip of FIG. 1A.
Figure 1A:
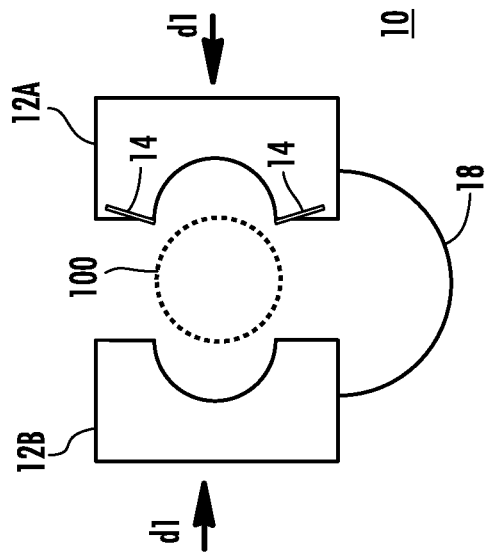
FIG. 1A is a schematic front view of a drain hose clip according to an exemplary embodiment of the invention.
Figure 1E:
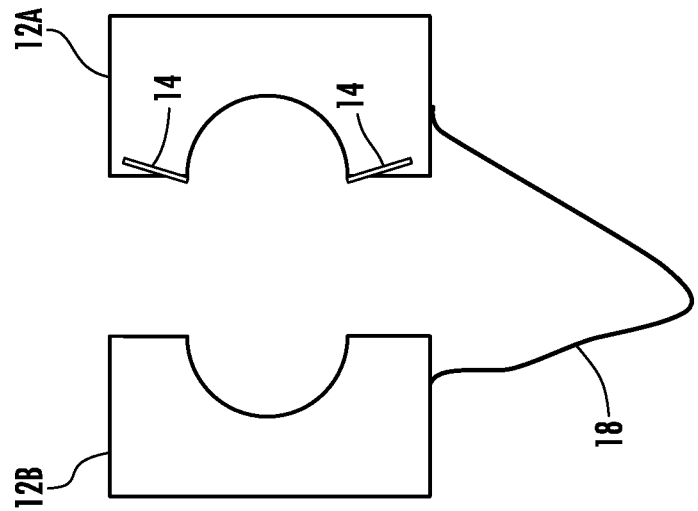
FIG. 1E is a schematic front view of a drain hose clip according to another exemplary embodiment of the invention.
Figure 1D:
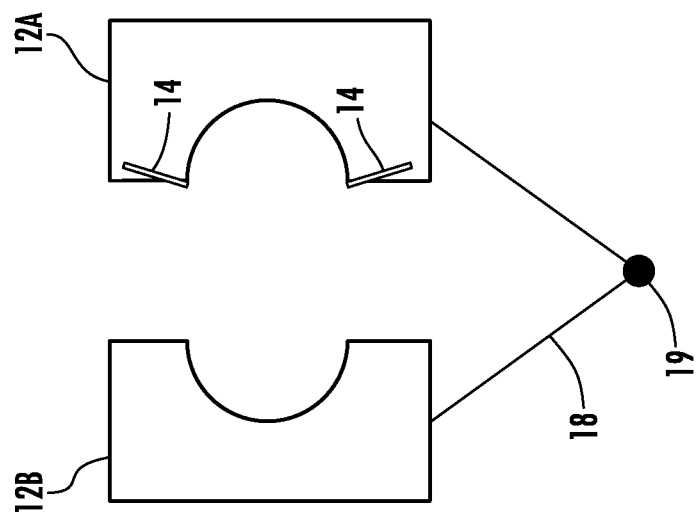
FIG. 1D is a schematic front view of a drain hose clip according to another exemplary embodiment of the invention.

For example, as shown in FIGS. 1A-1E, the drain hose clip 10 can include a connecting strip 18 (e.g., flexible connecting strip), or other suitable feature for moveably connecting the first portion 12A and second portion 12B, such as a hinge or the like, for coupling the first portion 12A to the second portion 12B while permitting movement of these portions with respect to each other. The connecting strip 18 is not limited to the illustrated embodiments. For example, as shown in FIG. 1D, the connecting strip 18 can include a hinge 19 or the like, for coupling the first portion 12A to the second portion 12B while permitting movement of these portions with respect to each other. In another embodiment, as shown for example, in FIG. 1E, the connecting strip 18 can include a wire, cable, rope (e.g., nylon rope), or the like, for coupling the first portion 12A to the second portion 12B while permitting movement of these portions with respect to each other.

In this manner, the first portion 12A and the second portion 12B of the drain hose clip 10 can be slid onto (e.g., around) the drain hose 100, for example from the bottom, top, or side of the drain hose, while the drain hose 100 is already inserted into an opening (e.g., 408 described in more detail with reference to FIG. 8) in the rear panel (e.g., 406 in FIG. 8) of a housing of an appliance. Next, the drain hose clip 10 can be coupled or secured to the drain hose 100, for example by snap-fitting the first portion 12A to the second portion 12B around the drain hose 100 in a direction d1 at the straight portion 113 of the drain hose 100 (described in more detail with reference to FIGS. 5A-6). The exemplary arrangement of the drain hose clip 10 can simplify the installation of a drain hose 100 into the drain hose clip 10 after the drain hose 100 is inserted into the opening 408 in the rear panel 406 of the washer housing.

As shown in FIGS. 1A-1C, the drain hose clip 10 can include one or more orientation features (e.g., 14, 16) that engage corresponding orientation features on the drain hose 100 (described in more detail with reference to FIGS. 5A-6), thereby ensuring that the drain hose 100 will be oriented properly for correct installation of one end of the drain hose 100 on a pump housing of the drain pump, or for insertion of the other end of the drain hose 100 into an external drain pipe located adjacent to the washer. The orientation features 14, 16 can be arranged such that the drain hose 100 can be coupled to the drain hose clip 10 in only a single way. One of ordinary skill in the art will recognize that the orientation features 14, 16 of the drain hose clip 10 are not limited to the illustrated exemplary embodiments and one or more corresponding orientation features can be provided on the drain hose 100 and/or the drain hose clip 10. The orientation features 14, 16 can be any suitable size or shape to engage the corresponding orientation features of a drain hose 100 and secure or maintain the orientation of the drain hose 100 with respect to the drain hose clip 10. The orientation features 14, 16 can be formed on one or more parts of the first portion 12A and/or the second portion 12B of the drain hose clip 10, such as on a face of the first portion 12A and/or the second portion 12B, a strengthening rib of the first portion 12A and/or the second portion 12B, etc. The number, type, size, and shape of the orientation features formed on the first portion 12A can be the same or different from those of the orientation features formed on the second portion 12B.

Figure 2C:
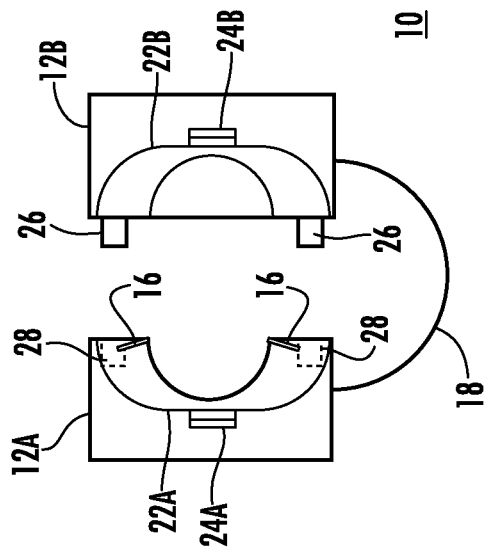
FIG. 2C is a schematic rear view of the drain hose clip of FIG. 2A.
Figure 2B:
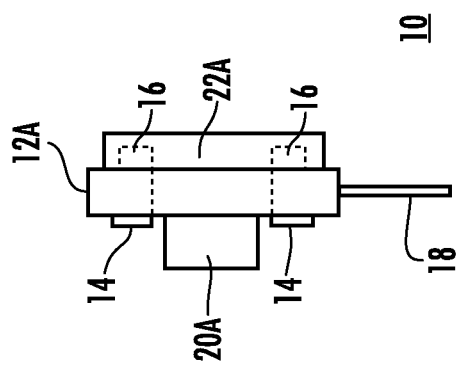
FIG. 2B is a schematic side view of the drain hose clip of FIG. 2A.
Figure 2A:
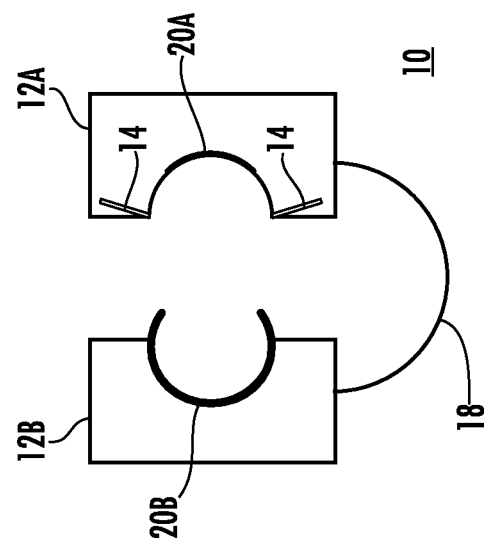
FIG. 2A is a schematic front view of a drain hose clip according to another exemplary embodiment of the invention.
Figure 3D:
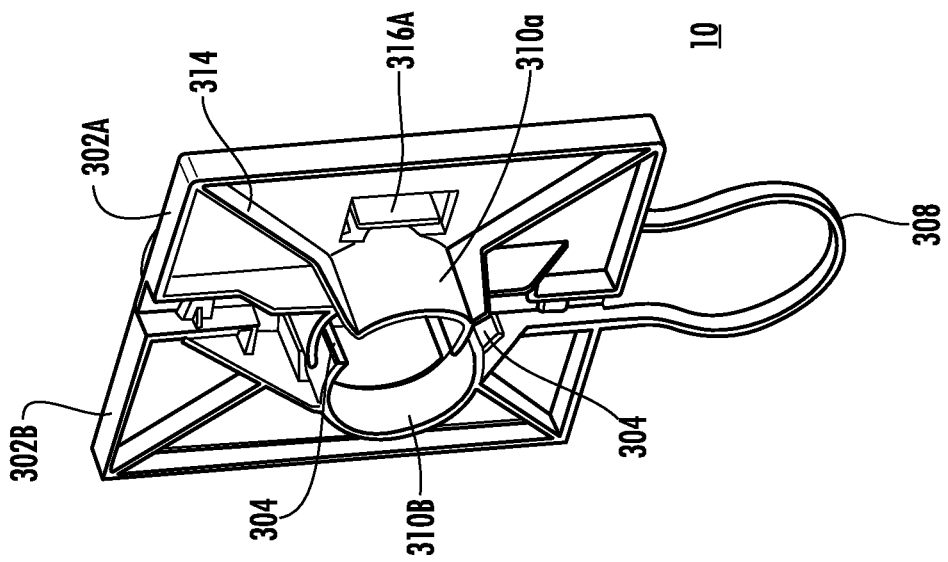
FIG. 3D is a perspective front view of the drain hose clip of FIG. 3B in a coupled state.
Figure 3C:
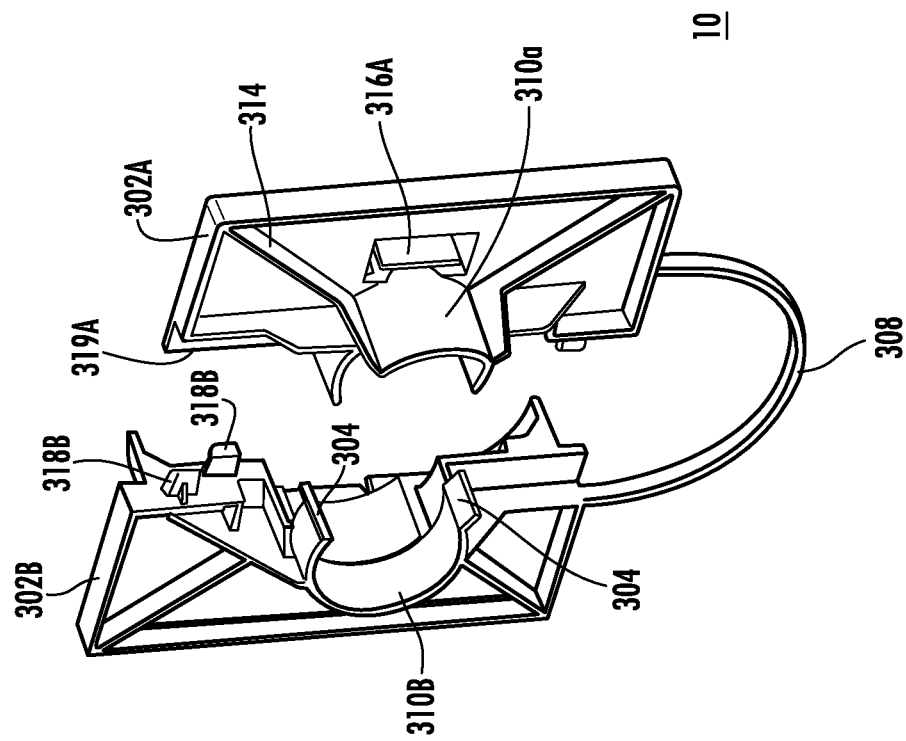
FIG. 3C is a perspective front view of the drain hose clip of FIG. 3A in an uncoupled state.
Figure 3F:
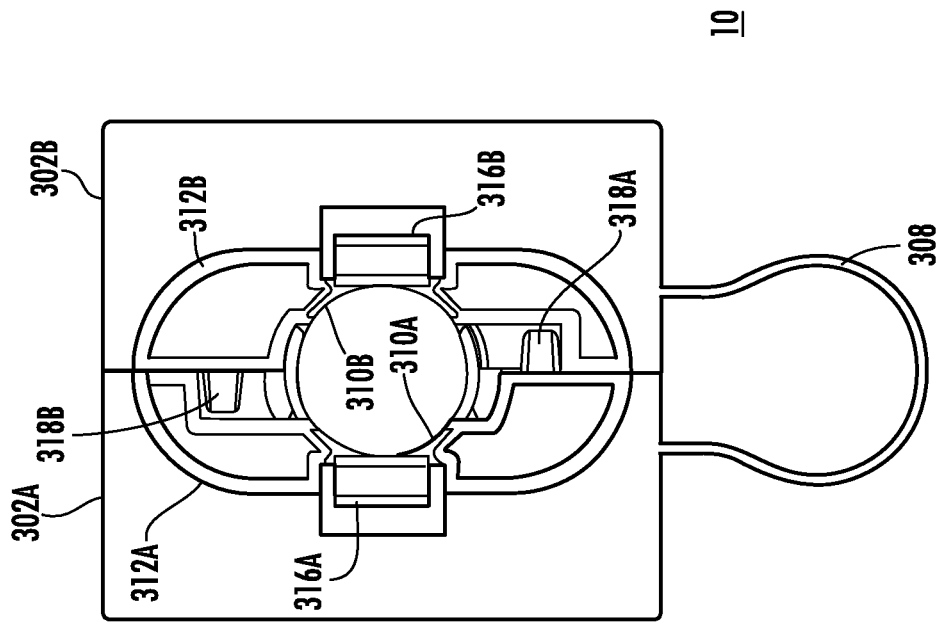
FIG. 3F is a rear view of the drain hose clip of FIG. 3B in a coupled state.
Figure 3E:
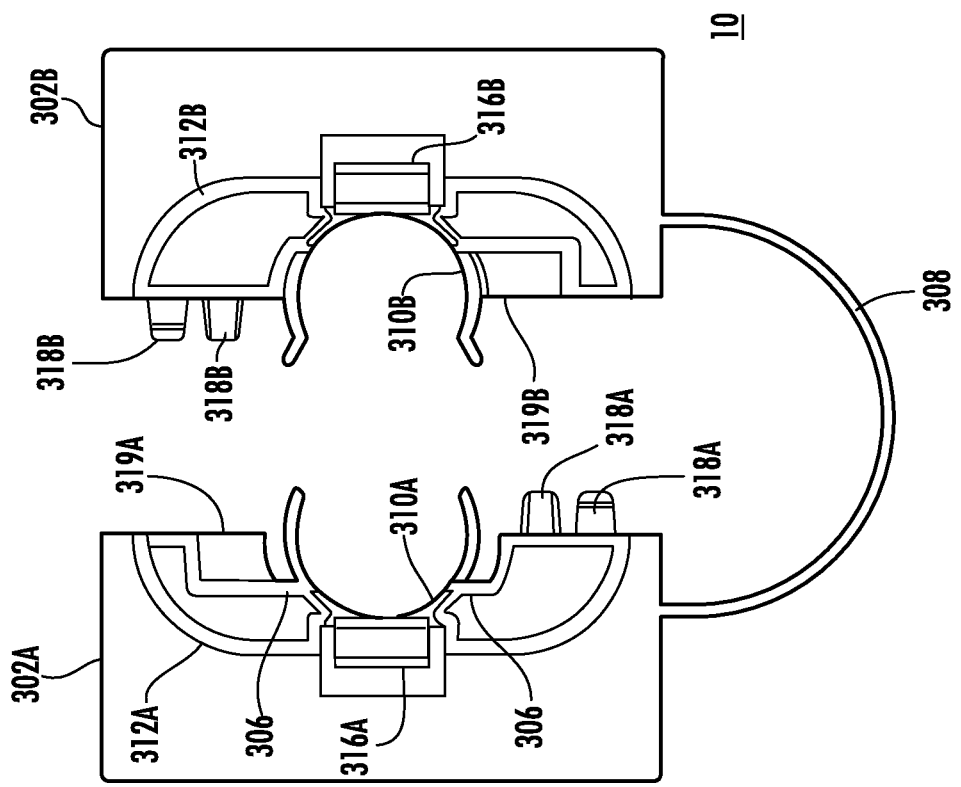
FIG. 3E is a rear view of the drain hose clip of FIG. 3A in an uncoupled state.
Figure 3H:
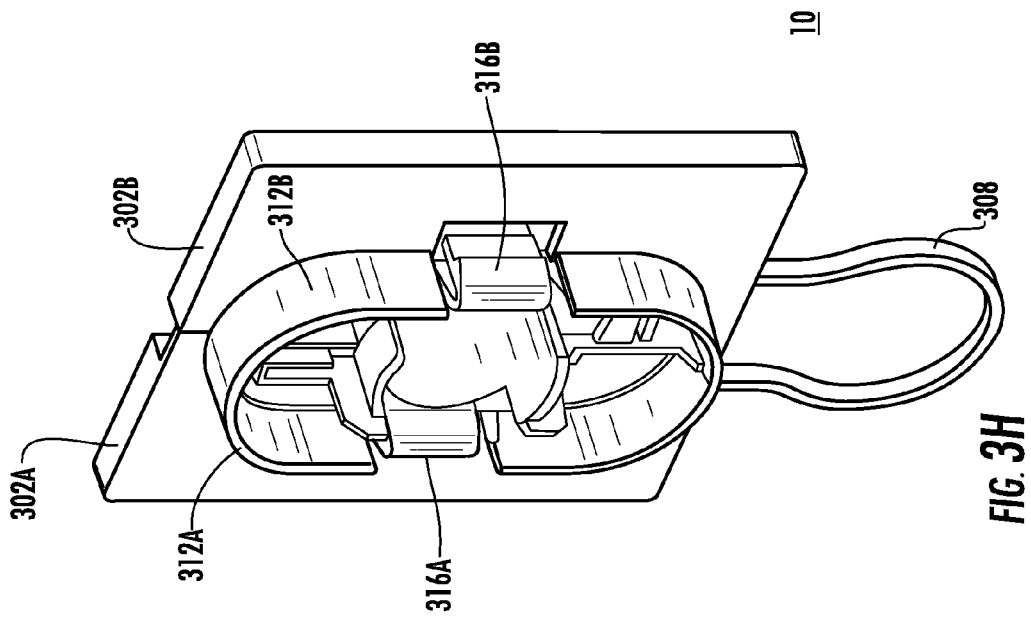
FIG. 3H is a perspective rear view of the drain hose clip of FIG. 3F in a coupled state.
Figure 3G:
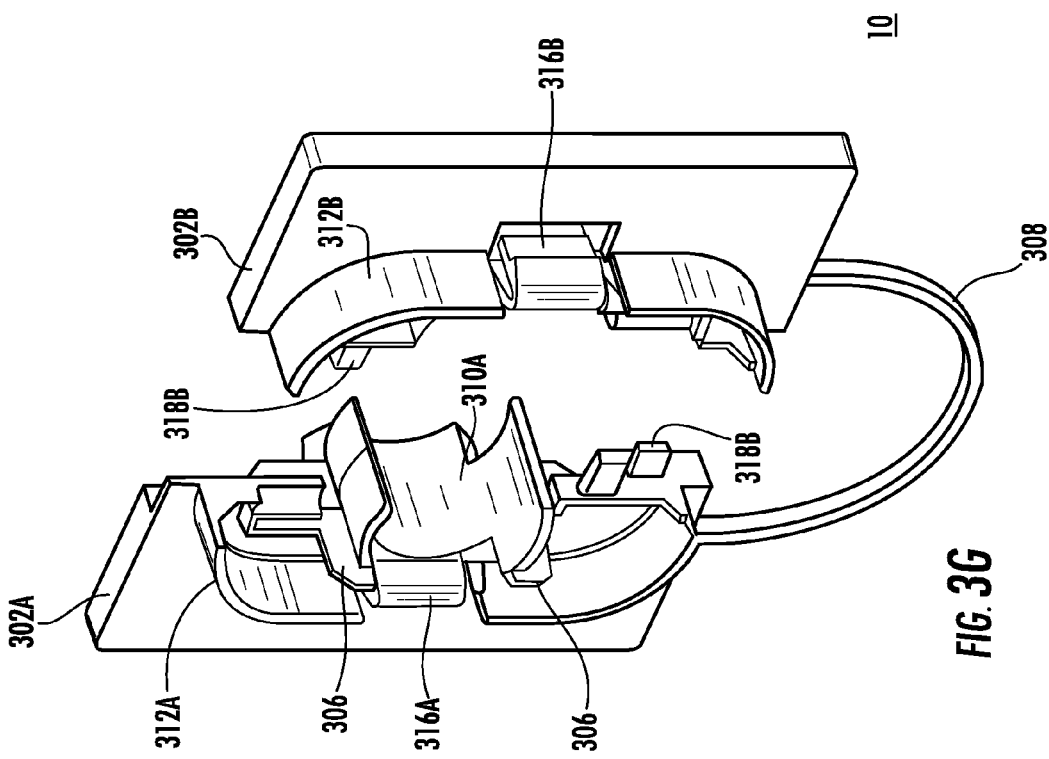
FIG. 3G is a perspective rear view of the drain hose clip of FIG. 3E in an uncoupled state.

As shown in FIGS. 2A-2C, an exemplary drain hose clip 10 can include one or more flanges (e.g., 20A, 20B) that engage and support a portion of the drain hose 100, for example, on an interior or exterior side of the wall of the appliance. In the exemplary embodiment, the flanges 20A, 20B are illustrated on the front side of the drain hose clip 10, but are not limited to this arrangement. The flanges 20A, 20B can be any suitable size or shape to engage the drain hose 100 and secure or support the drain hose 100. One or more flanges 20A, 20B can be formed on the first portion 12A and/or the second portion 12B of the drain hose clip 10. A number of flanges formed on the first portion 12A can be the same or different from a number of flanges formed on the second portion 12B. In other embodiments, the flanges 20A, 20B (or one or more ends of the flanges 20A, 20B) can include one or more orientation features 14, 16.

With reference again to FIGS. 2A-2C, an exemplary drain hose clip 10 can include one or more orientation or mating features (e.g., 22A, 22B) that engage a cutout or an opening in the rear panel of the housing of the appliance. The orientation or mating features 22A, 22B can have a size and shape that corresponds to a size and shape of the cutout or opening in the rear panel to secure and maintain the position of the drain hose clip 10 with respect to the rear panel of the housing of the appliance. For example, the orientation or mating features 22A, 22B can form an oblong or oval shape, as illustrated in FIG. 2C. In the exemplary embodiment, the orientation or mating features 22A, 22B are illustrated on the rear side of the drain hose clip 10, but are not limited to this arrangement. The orientation or mating features 22A, 22B also are not limited to the illustrated shapes and can include other shapes, such as a square shape, rectangular shape, diamond shape, hexagonal shape, T-shape, cross-shape, etc. that fixes the position and orientation of the drain hose clip 10 in the cutout or opening of the rear panel. One or more orientation or mating features 22A, 22B can be formed on the first portion 12A and/or the second portion 12B of the drain hose clip 10. A number of orientation or mating features 22A, 22B formed on the first portion 12A can be the same or different from a number of orientation or mating features 22A, 22B formed on the second portion 12B. In other embodiments, the orientation or mating features 22A, 22B can include one or more orientation features 14, 16.

Additionally or alternatively, an exemplary drain hose clip 10 can include one or more tabs or projections 24A, 24B (e.g., resilient or movable tabs or projections) for engaging an interior of the cutout or opening of the rear panel to secure the drain hose clip 10 in place. The tabs or projections can extend or wrap around an edge of the cutout or opening of the rear panel to prevent the removal of the drain hose clip 10 from the rear panel after it is installed. The tabs or projections can be configured to permanently or removably/releasably secure or lock the drain hose clip 10 in the cutout or opening of the rear panel of the appliance. The tabs or projections 24A, 24B can be integrally formed with the orientation or mating features 22A, 22B, as shown in the exemplary embodiment, or formed on other parts of the first portion 12A and/or the second portion 12B of the drain hose clip 10. The tabs or projections 24A, 24B also can control the orientation of the drain hose clip 10 with respect to the rear panel.

With reference again to FIGS. 2A-2C, an exemplary drain hose clip 10 can include one or more alignment or coupling features, such as one or more projections or tabs 26 and one or more corresponding sockets 28, formed on the first portion 12A and/or the second portion 12B of the drain hose clip 10 to assist with aligning and coupling the first portion 12A to the second portion 12B, for example, by snap-fitting the first portion 12A to the second portion 12B. The alignment or coupling features on each portion of the drain hose clip 10 can have a size and shape that corresponds to a size and shape of a corresponding alignment or coupling feature on the other portion of the drain hose clip 10. Alternatively, the alignment or coupling features can be configured to engage another feature or surface of the other portion of the drain hose clip 10. For example, a plurality of alignment or coupling features on one portion of the drain hose clip 10 can cooperate to engage a surface of the other portion of the drain hose clip. The alignment or coupling features a projection, tab, or key for engaging a corresponding surface, opening, or grove in a corresponding alignment or coupling feature, or for engaging a corresponding surface, opening, or grove, of the other portion of the drain hose clip. One or more alignment or coupling features can be formed on the first portion 12A and/or the second portion 12B of the drain hose clip 10. A number of alignment or coupling features formed on the first portion 12A can be the same or different from a number of alignment or coupling features formed on the second portion 12B.

With reference again to FIGS. 3A-3L, an exemplary embodiment of a drain hose clip 10 for engaging, for example, a drain hose 100, as exemplarily illustrated in FIGS. 4A-6, will now be described.

As shown in FIGS. 3A-3L, the exemplary drain hose clip 10 can include a first portion 302A and a second portion 302B that engage each other to form the drain hose clip 10. For example, the first portion 302A and second portion 302B can be coupled around (e.g., wrapped around) the drain hose 100 without having to insert the length of the drain hose 100 through an opening formed by the drain hose clip 10. The first portion 302A and second portion 302B can be separate parts, or the first portion 302A and second portion 302B can be moveably coupled together.

The drain hose clip 10 can include a connecting strip 308 (e.g., flexible connecting strip), or other suitable feature for moveably connecting the first portion 302A and second portion 302B, such as a hinge or the like, for coupling the first portion 302A to the second portion 302B while permitting movement of these portions with respect to each other. The connecting strip 308 is not limited to the illustrated embodiments, and can include other arrangements, such as a hinge, wire, cable, rope (e.g., nylon rope), or the like, for coupling the first portion 302A to the second portion 302B while permitting movement of these portions with respect to each other. In this manner, the first portion 302A and the second portion 302B of the drain hose clip 10 can be slid onto (e.g., around) the drain hose 100, for example from the bottom, top, or side of the drain hose, while the drain hose 100 is already inserted into an opening (e.g., 408 described in more detail with reference to FIG. 8) in the rear panel (e.g., 406 in FIG. 8) of a housing of an appliance. The drain hose clip 10 can be coupled or secured to the drain hose 100, for example by snap-fitting the first portion 302A to the second portion 302B around the drain hose 100.

The drain hose clip 10 can include one or more orientation features (e.g., 304, 306) that engage corresponding orientation features on the drain hose 100 (described in more detail with reference to FIGS. 5A-6), thereby ensuring that the drain hose 100 will be oriented properly for correct installation of one end of the drain hose 100 on a pump housing of the drain pump, or for insertion of the other end of the drain hose 100 into an external drain pipe located adjacent to the washer. The orientation features 304, 306 can be arranged such that the drain hose 100 can be coupled to the drain hose clip 10 in only a single way. One of ordinary skill in the art will recognize that the orientation features 304, 306 of the drain hose clip 10 are not limited to the illustrated exemplary embodiments and one or more corresponding orientation features can be provided on the drain hose 100 and/or the drain hose clip 10. The orientation features 304, 306 can be any suitable size or shape to engage the corresponding orientation features of a drain hose 100 and secure or maintain the orientation of the drain hose 100 with respect to the drain hose clip 10. The orientation features 304, 306 can be formed on one or more parts of the first portion 302A and/or the second portion 302B of the drain hose clip 10, such as on a face of the first portion 302A and/or the second portion 302B, a strengthening rib 314 of the first portion 302A and/or the second portion 302B, etc. The number, type, size, and shape of the orientation features formed on the first portion 302A can be the same or different from those of the orientation features formed on the second portion 302B.

The exemplary drain hose clip 10 can include one or more flanges (e.g., 310A, 310B) that engage and support a portion of the drain hose 100. The flanges 310A, 310B can be any suitable size or shape to engage the drain hose 100 and secure or support the drain hose 100. One or more flanges 310A, 310B can be formed on the first portion 302A and/or the second portion 302B of the drain hose clip 10. A number of flanges formed on the first portion 302A can be the same or different from a number of flanges formed on the second portion 302B. The flanges 310A and/or 310B can be formed to snap-fit around the drain hose 100 to secure the drain hose 100 to the drain hose clip 10. Alternatively, the flanges 310A, 310B can partially or entirely encircle the drain hose 100 without snap-fitting when the first portion 302A is coupled to the second portion 302B.

In the illustrated embodiment of FIGS. 3A-3L, each end of the flanges 310A includes an orientation feature 304 on a front side of the drain hose clip 10 for engaging a corresponding orientation feature of the drain hose 100 on the internal side of the rear panel of the appliance. The drain hose clip 10 also includes a pair of orientation features 306 projecting from the rear side of the drain hose clip 10 for engaging a corresponding orientation feature of the drain hose 100 on the external side of the rear panel of the appliance.

The exemplary drain hose clip 10 includes orientation or mating features (e.g., 312A, 312B) that engage a cutout or an opening in the rear panel of the housing of the appliance. The orientation or mating features 312A, 312B are configured to have a size and shape that corresponds to a size and shape of the cutout or opening in the rear panel to secure and maintain the position of the drain hose clip 10 with respect to the rear panel of the housing of the appliance. In the illustrated example, the orientation or mating features 312A, 312B form an oblong or oval shape that matches the cutout 408 in the rear panel 406 (as described in greater detail with reference to FIGS. 8-12). The orientation or mating features 312A, 312B are illustrated on the rear side of the drain hose clip 10, but are not limited to this arrangement. The orientation or mating features 312A, 312B also are not limited to the illustrated shapes and can include other shapes, such as a square shape, rectangular shape, diamond shape, hexagonal shape, T-shape, cross-shape, etc. that fixes the position and orientation of the drain hose clip 10 in the cutout or opening of the rear panel. One or more orientation or mating features 312A, 312B can be formed on the first portion 302A and/or the second portion 302B of the drain hose clip 10. A number of orientation or mating features 312A, 312B formed on the first portion 302A can be the same or different from a number of orientation or mating features 312A, 312B formed on the second portion 302B. In other embodiments, the orientation or mating features 312A, 312B can include one or more orientation features 304, 306.

The exemplary drain hose clip 10 includes one or more tabs or projections 316A, 316B (e.g., resilient or movable locking tabs or projections) for engaging an interior of the cutout or opening of the rear panel to secure the drain hose clip 10 in place. The tabs or projections 316A, 316B extend or wrap around an edge of the cutout or opening of the rear panel to prevent the removal of the drain hose clip 10 from the rear panel after it is installed. The tabs or projections 316A, 316B can be configured to permanently or removably/releasably secure or lock the drain hose clip 10 in the cutout or opening of the rear panel of the appliance. In the exemplary embodiment, the tabs or projections 316A, 316B are integrally formed with the orientation or mating features 312A, 312B of the drain hose clip 10. The tabs or projections 316A, 316B also can control the orientation of the drain hose clip 10 with respect to the rear panel.

The exemplary drain hose clip 10 includes one or more alignment or coupling features, such as tabs 318A, 318B formed on the first portion 302A and/or the second portion 302B of the drain hose clip 10 to assist with aligning and coupling the first portion 302A to the second portion 302B. In the illustrated example, the tabs 318A, 318B cooperate with each other to engage a corresponding surface 319A, 319B of the drain hose clip 10 when the drain hose clip 10 is in an assembled state. The tabs 318A, 318B can include curved, tapered, or chamfered ends to guide the tabs 318A, 318B over the corresponding feature, such as surface 319A, 319B. The tabs 318A, 318B can include projections or locking tabs for engaging corresponding features, such as cutouts, openings, grooves, or the like formed in the surface 319A, 319B. In other embodiments, the tabs 318A, 318B can engage corresponding sockets or the like formed on the drain hose clip 10.

Figure 4B:
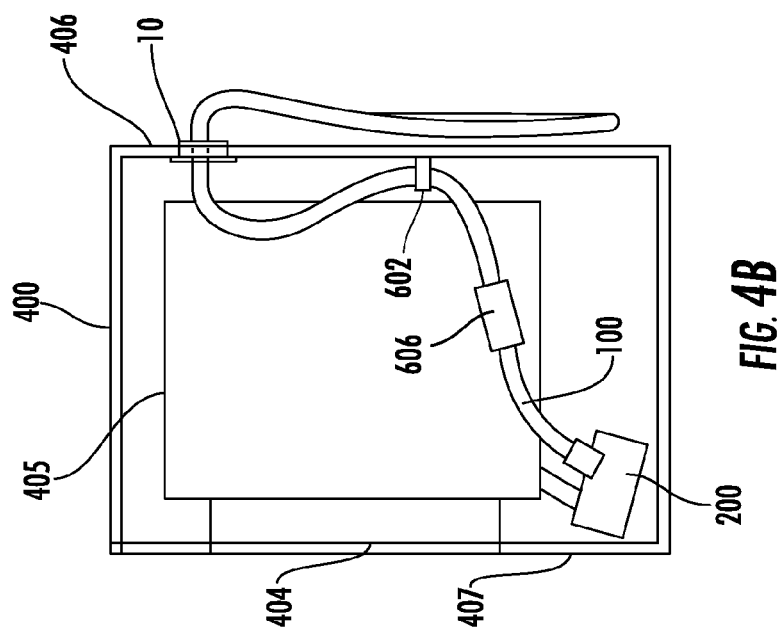
FIG. 4B is schematic side interior view of the washer of FIG. 4A.
Figure 4A:
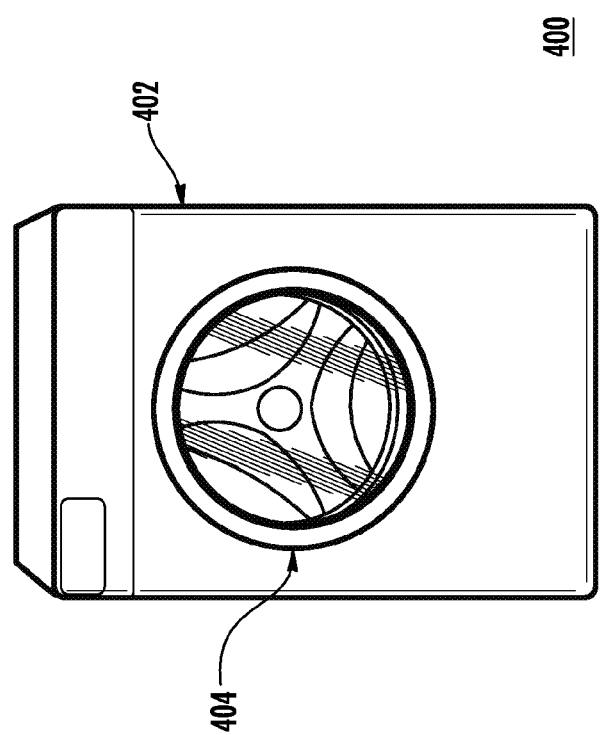
FIG. 4A is a schematic front view of a washer according to an exemplary embodiment of the invention.

With reference to FIGS. 4A and 4B, an example of a household appliance including a continuous one-piece drain hose 100 and a drain hose clip 10 will now be described.

The household appliance can be a washer, such as a front load washer 400, having a housing 402 and a door 404 for accessing a rotatable drum (not shown) that is rotatably mounted in a tub 405 within the housing 404. The washer 400 includes a drain pump 200 for pumping out washing or rinsing liquid from the tub to an exterior (e.g., an external drain facility), and a continuous one-piece drain hose 100 that connects the drain pump 200 and the external drain facility, such as a drain pipe, for discharging the washing or rinsing liquid pumped by the drain pump to the exterior. The continuous one-piece drain hose 100 extends through an opening or cutout in the rear panel 406 of the washer 400 such that one end of the drain hose 100 can be connected to an external drain facility and the other end of the drain hose 100 is connected to the drain pump 200 within the appliance. In the illustrated embodiment, the drain pump 200 is located adjacent to the front lower portion of the front panel 407 of the washer 400 to facilitate easy access to the drain pump 200 for maintenance or removal/replacement. The drain hose 100 extends from the cutout in the rear panel 406 along the interior of the side panel of the washer 400 to the drain pump 200 in the front lower portion of the appliance. The internal clearance within the housing of the washer for routing the drain hose 100 may be limited or restricted depending on the particular arrangement of the drain pump 200, drain hose 100, and other components of the washer.

The drain hose 100 can be secured to the inside of the rear panel 406 of the housing, for example, a side panel clip 602 or the like to provide additional protection against the drain hose 100 moving into contact with the oscillating system, such as the drum 405/tub and suspension system (not shown). The drain hose 100 can include a sleeve 606, such as a resilient sleeve formed from rubber, foam, or sponge material, for reducing sound resulting from the liquid passing through the drain hose 100, the drain hose 100 contacting the side panel of the washer 400, etc.

The washer 400 can include a drain hose clip 10 according to the exemplary embodiments. The drain hose clip 10 can include an orientation control feature that controls and maintains the correct alignment of the drain hose 100 for assembly with the drain pump 200 by the operator at a pump station of the assembly line. In this manner, the drain hose clip 10 can reduce or prevent any need for the operator to force, twist, or bend the drain hose 100 into correct alignment with the drain pump 200, thereby reducing or preventing damage to the drain hose 100, such as kinking, stress marks or cracks, or other damage or accelerated wear resulting from portions of the drain hose 100 being moved into, or springing into, contact with internal components of the appliance, such as the oscillating system of the appliance. The exemplary drain hose clip 10 also can include a securing feature that ensures that the drain hose 100 is easily and efficiently secured and fixedly aligned with the opening or cutout 408 in the rear panel 406 of the appliance 400. In this manner, the drain hose clip 10 can reduce or prevent misalignment of the drain hose 100 resulting, for example, from bending of the drain hose 100 during the assembly, packaging, or shipping processes, thereby reducing or preventing misalignment, accelerated wear, or damage to the drain hose 100. The drain hose clip 10 that can control the orientation of the drain hose 100 and the drain hose clip 10 with respect to each other, as well as to the opening or cutout 408 in the rear panel 406 of the washer 400. The drain hose clip 10 also can reduce or prevent movement of the drain hose 100 into and out of the opening 408 in the rear panel 406 of the washer 400, thereby reducing or preventing damage from the drain hose 100 rubbing against the rear panel 406 or the opening 408 of the rear panel 406.

Figure 6:
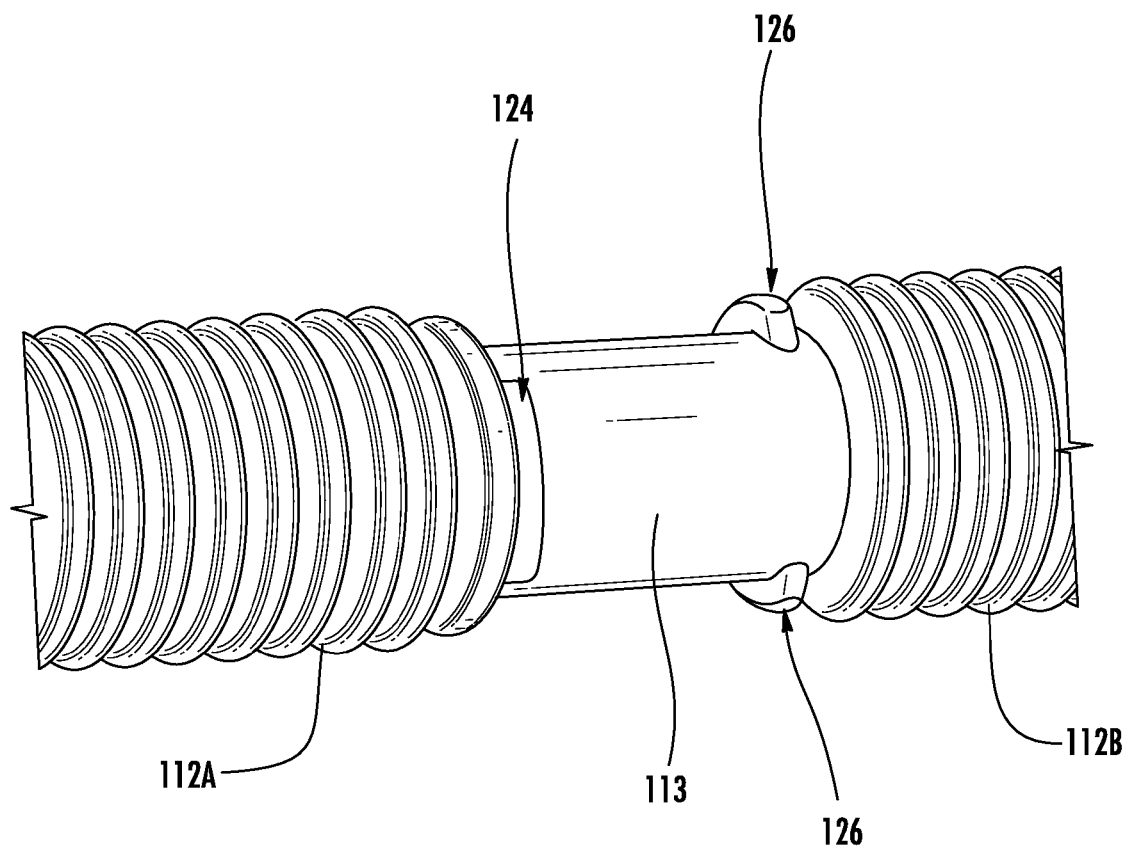
FIG. 6 is a partial perspective view of a drain hose having a straight section according to an exemplary embodiment of the invention.

With reference to FIGS. 5A-6, an example of a continuous, one-piece drain hose 100 for use in an appliance, such as the washer 400, will now be described.

As shown in FIGS. 5A-5D, an exemplary embodiment of the drain hose 100 can include a first open end 115, a second open end 117, a continuous portion extending from the first open end 115 to the second open end 117. The continuous portion can include a continuous, one-piece construction having a flex section (e.g., double-flex section 112) which can improve flexibility and save space inside the washer and outside the washer for providing sufficient clearance for product packaging. The drain hose 100 can include normal corrugation sections (e.g., 114, 116) between the double flex-section 112 and the open ends 115, 117 of the drain hose 100, as shown for example in FIG. 5D.

The first open end 115 of the drain hose 100 can be configured for coupling to a pump housing of a drain pump 200 inside the washer 400. For example, the first open end 115 of the drain hose 100 can include an orientation feature, such as a ring portion 120, that engages a corresponding orientation feature of the pump housing, thereby ensuring that the drain hose 100 is installed in the correction orientation to avoid or prevent twisting of the drain hose 100 when the drain hose 100 is coupled to the rear panel of an appliance in an assembled state. The second open end 117 can be configured for insertion into, or coupling with, an external drain pipe (not shown).

As exemplarily illustrated in FIGS. 5B and 5C, the double-flex section 112 can include a first flex section 112A having a plurality of first repeating profiles, wherein a cross-section of each profile includes a ridge 104 and a trough 106, and wherein the ridge 104 has at least three predetermined bending points and/or the trough 106 has at least two predetermined bending points. The double-flex section 112 of the drain hose 100 also can include a second flex section 112B having a plurality of second repeating profiles, which may be similar to the repeating profiles of the first flex section 112A. Alternatively, the second flex section 112B can include a plurality of second repeating profiles that are different from the first repeating profiles of the first flex section 112A.

In an exemplary embodiment, the double-flex section 112 of the drain hose also can include a straight section 113 (i.e., a non-bendable or low flexibility section, or non-corrugated section) interposed between the two flex sections 112A, 112B. The straight portion 113 can include a mating surface (e.g., a smooth cylindrical surface) for receiving a drain hose clip (e.g., 10) to secure the drain hose 100 to a household appliance.

The drain hose 100 can include one or more additional straight sections (i.e., non-corrugated sections), such as a straight section 119 illustrated in FIG. 5A. In the example of FIG. 5A, another section 118 having a normal corrugation profile (e.g., similar to the profile of FIG. 5D) can separate the straight section 119 from the ring portion 120 of the first open end 115, thereby providing flexibility for positioning and coupling the first open end 115 of the drain hose 100 to a pump housing of a drain pump inside the washer. Alternatively, the section 118 can be formed from a plurality of repeating rings similar to those of the flex-sections 112A, 112B (shown in FIG. 5C), thereby providing greater flexibility and ease with which the drain hose 100 can be coupled to the drain pump.

With reference to FIG. 6, an example of a drain hose 100 having a double-flex section 112, which includes a straight section 113 (i.e., a non-bendable or low flexibility section, or non-corrugated section) interposing two flex sections 112A, 112B, will now be described.

As explained above, the straight portion 113 can include a mating surface (e.g., a smooth cylindrical surface) for receiving a drain hose clip (e.g., 10) to secure the drain hose 100 to a household appliance. The straight section 113 of the drain hose 100 can include one or more alignment or orientation features 124, 126 for ensuring a correct orientation of the drain hose 100 with respect to a drain hose clip 10 or the like, and for securing the drain hose 100 to an opening in a rear panel 406 of the washer housing.

For example, the straight section 113 can include two orientation features 124, 126 for engaging the corresponding orientation features 304, 306 on the exemplary drain hose clip 10 illustrated in FIGS. 3A-3L, thereby ensuring a correct orientation of the drain hose 100 with respect to a drain hose clip 10. The orientation features 124, 126 can be different such that there is only a single way to connect the drain hose clip 10 to the drain hose 100, thereby further ensuring that the drain hose clip 10 is properly orientated with respect to the drain hose 100 and the rear panel 406 of the washer housing. In an exemplary embodiment, one of the orientation features 124, 126 can include a raised projection or disc portion that extends away from the surface of the straight section 113 and extends partially around a circumference of the straight portion 113. One of ordinary skill in the art will recognize that the orientation features are not limited to the illustrated exemplary embodiments and one or more orientation features can be provided on the drain hose 100 and/or the drain hose clip 10. The orientation features can be projections or the like that extend from the surface of the drain hose 100, or grooves, channels, or the like that are recessed into the surface of the drain hose 100, or combinations thereof. In this manner, the straight section 113 can engage and be coupled to a drain hose clip 10 for securing the drain hose 100 to an opening 408 in the rear panel 406 (e.g., as shown in FIGS. 8-12 described in greater detail below) of a housing 402 of a washer 400.

With reference to FIGS. 7A-7C, the drain hose 100 can include a first open end 115 for coupling to a pump housing 202 of a drain pump 200 inside the washer. The drain pump 200 and drain hose 100 can include a poka-yoke assembly to ensure that the drain hose 100 only can be oriented and assembled to the fitting of the drain pump 200 in a single correct position, thereby eliminating or reducing assembly errors.

In the exemplary embodiment, a pump housing fitting 202 can include an orientation feature 204, such as a key, tab, projection, or the like. The first open end 115 of the drain hose 100 can include a corresponding orientation feature, such as an end ring portion 120 having an opening section 122 that engages the orientation feature 204 of fitting 202 of the drain pump 200. The corresponding orientation features 120/122 and 204 ensure that the drain hose 100 is installed in the correction orientation. A rubber o-ring can be included in this assembly to prevent leakage from this connection. One of ordinary skill in the art will recognize that the orientation features are not limited to the illustrated exemplary embodiments and one or more orientation features can be provided on the drain hose 100 or the fitting of the housing 202, the drain pump 200, etc. For example, in the illustrated embodiment, the first open end 115 of the drain hose 100 also includes a projection or locking tab 121 that engages a corresponding cutout 203 on the fitting 202 of the drain pump 200. In this manner, the opening section 122 of the drain hose 100 must be aligned with the corresponding projection or key portion 204 on the fitting 202 of the drain pump and the lock tab 121 must be aligned with corresponding cutout 203 on the fitting 202 of the drain pump 200 to facilitate a proper connection of the drain hose 100 to the drain pump 200, thereby ensuring a correct assembly of the drain hose 100 to the drain pump 200 by the operator.

The drain hose 100 can include one or more additional straight sections (i.e., non-corrugated sections), such as straight section 119 shown in FIG. 7A. Another section 118 having a normal corrugation profile can separate the straight section 119 from the ring portion 120 of the first open end 115, thereby providing flexibility for positioning and coupling the first open end 115 of the drain hose 100 to the pump housing 202 of the drain pump 200 inside the washer. The section 118 can be formed from a plurality of repeating rings similar to those of the flex-sections 112A, 112B, thereby providing greater flexibility and ease with which the drain hose 100 can be coupled to the pump housing 202 of the drain pump 200 inside the washer.

With reference to FIGS. 8-16, an exemplary method of assembling a drain hose clip 10 to a drain hose 100, and a method of assembling the drain hose clip 10 and a drain hose 100 with an appliance, such as a washer 400, will now be described. In FIGS. 8, 12, 13, and 15, a portion of the rear panel is illustrated as being transparent for illustrative and clarification purposes only, such that the arrangement of the drain hose 100 on the interior and exterior of the rear panel 406 is visible.

Figure 8:
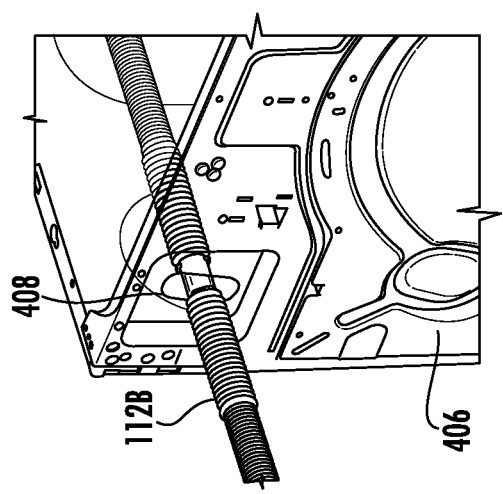
FIG. 8 is a partial perspective assembly view of a rear panel of a washer housing and a drain hose according to an exemplary embodiment of the invention.

In operation, the drain hose 100 commonly will be assembled to the rear panel 406 of the washer 400 at one station (i.e., a rear panel station) of the assembly line, and assembled to the drain pump 200 at another station (i.e., pump station) of the assembly line. At the rear panel station, an operator commonly will work from the rear of the washer 400 and in an area close to the top portion of the rear panel 406 for assembly tasks. As illustrated in FIG. 8, the drain hose 100 is fed into an opening or cutout 408 of the rear panel 406 of the washer 400 and toward the front of the washer 400 along the interior of the side panel in a space between the oscillating system (e.g., tub 405/drum assembly and damping/suspension system (not shown)) and the inside of the side panel of the washer 400.

Figure 9:
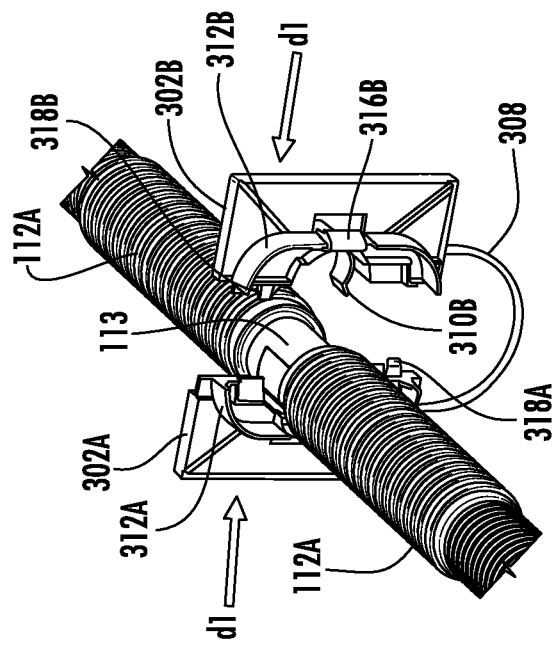
FIG. 9 is a partial perspective assembly view of a drain hose clip and drain hose according to an exemplary embodiment of the invention.

Next, the first portion 302A and second portion 302B of the drain hose clip 10 can be coupled around (e.g., wrapped around) a drain hose 100 without having to insert the length of the drain hose 100 through the drain hose clip 10. As illustrated in FIG. 9, the first portion 302A and the second portion 302B of the drain hose clip 10 can be slid onto (e.g., around) the drain hose 100, for example from below, while the drain hose 100 is already inserted into an opening 408 in the rear panel 406 of the washer 400. Next, the first portion 302A can be coupled to the second portion 302B, for example, by snapping fitting as shown in FIG. 9. The tabs 318A, 318B formed on the first portion 302A and the second portion 302B of the drain hose clip 10 assist with aligning and coupling the first portion 302A to the second portion 302B. In the illustrated example, the tabs 318A, 318B cooperate with each other to engage a corresponding surface 319A, 319B of the drain hose clip 10 when the drain hose clip 10 is in an assembled state.

Figure 11:
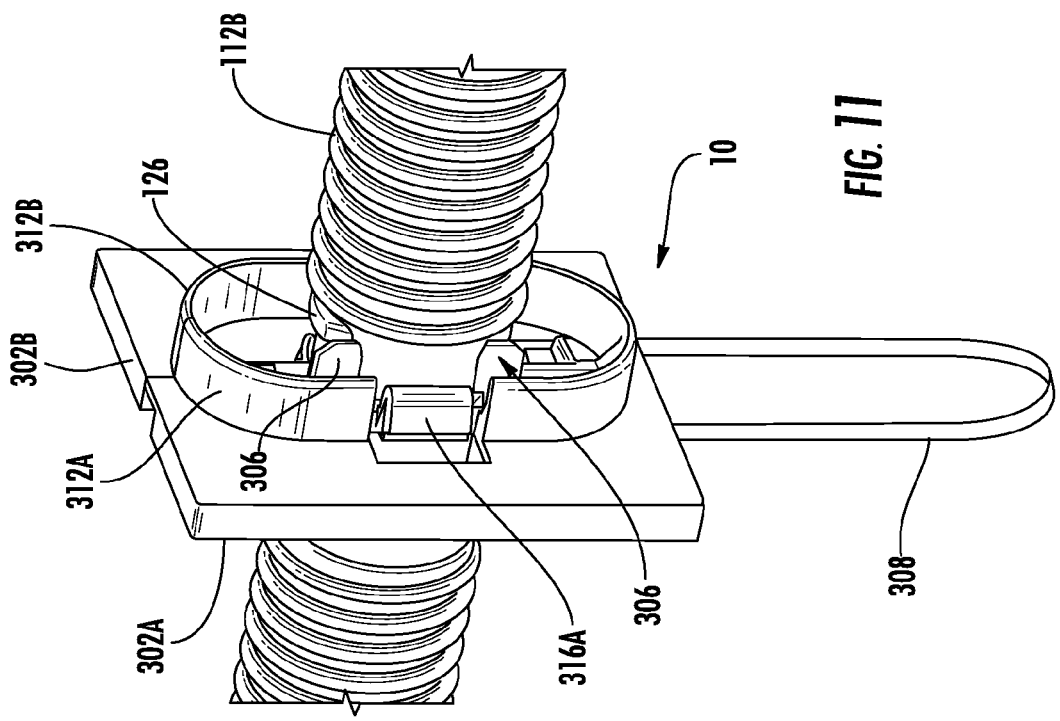
FIG. 11 is another partial perspective view of the drain hose clip and the drain hose of FIG. 10.
Figure 10:
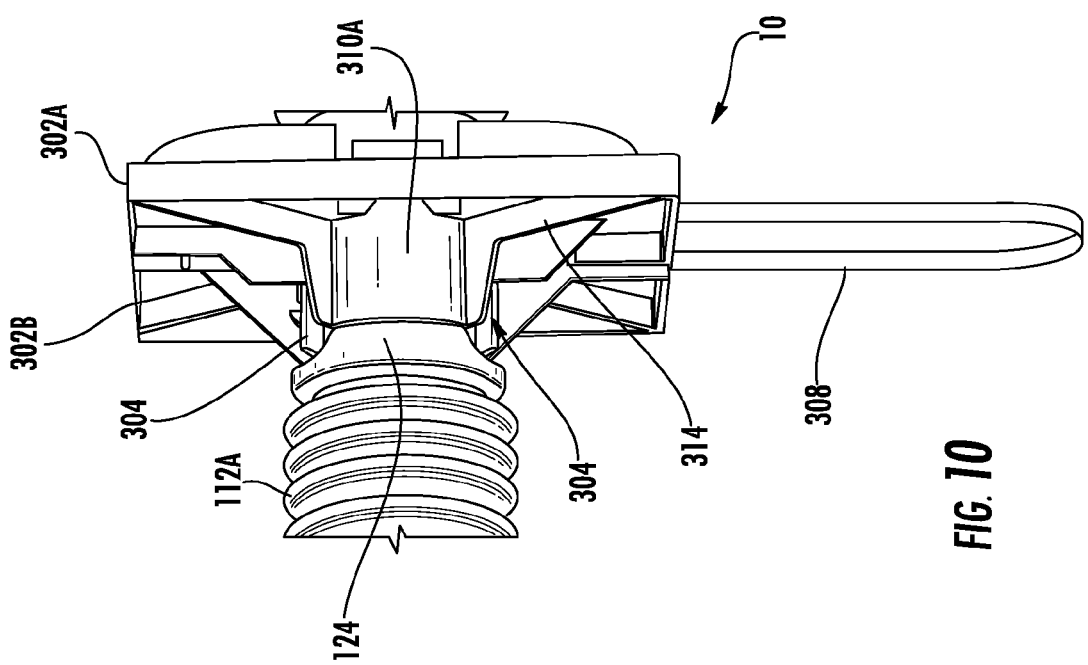
FIG. 10 is a partial perspective view of a drain hose clip and a drain hose according to an exemplary embodiment of the invention.
Figure 13:
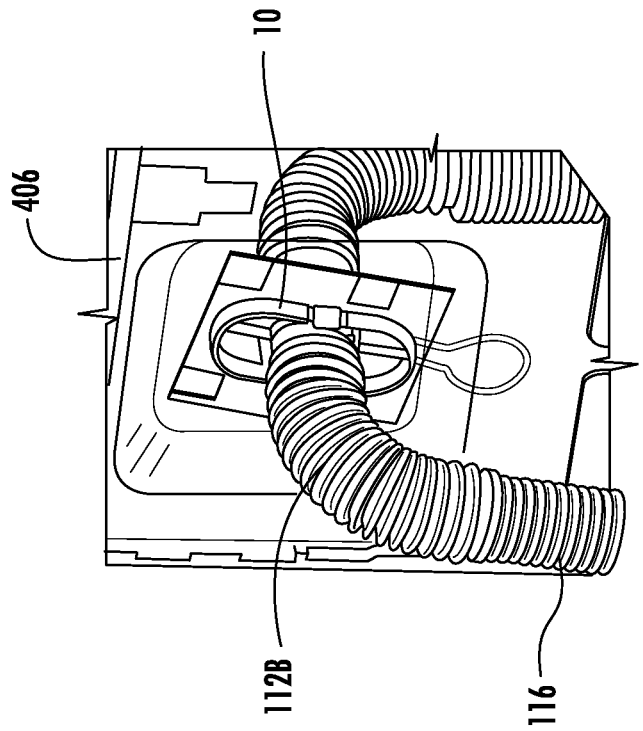
FIG. 13 is another partial rear perspective assembly view of a rear panel of a washer housing and an assembled drain hose clip and drain hose according to an exemplary embodiment of the invention.

As illustrated for example in FIGS. 10 and 11, the exemplary drain hose clip 10 includes flanges 310A, 310B that engage and support a straight portion 113 of the drain hose 100. The drain hose clip 10 includes orientation features 304, 306 that engage corresponding orientation features 124, 126 on the drain hose 100, thereby ensuring that the drain hose 100 will be oriented properly for correct installation of one end of the drain hose 100 on the pump housing 202 of the drain pump 200. In the exemplary embodiment, the orientation features 304, 306 are arranged such that the drain hose 100 can be coupled to the drain hose clip 10 in only a single way. One of ordinary skill in the art will recognize that the orientation features 304, 306 of the drain hose clip 10 are not limited to the illustrated exemplary embodiments and one or more corresponding orientation features 304, 306, 124, 126 can be provided on the drain hose 100 and/or the drain hose clip 10.

Figure 12:
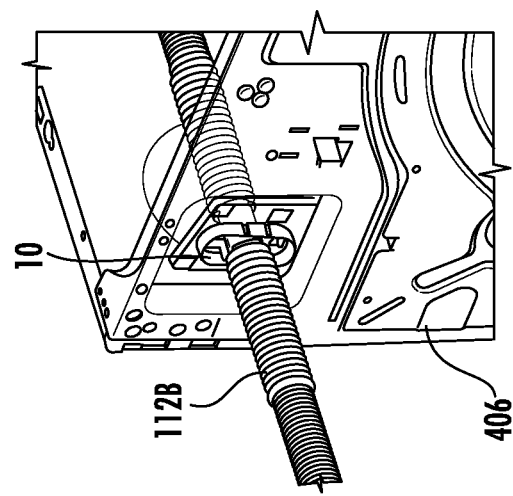
FIG. 12 is a partial rear perspective assembly view of a rear panel of a washer housing and an assembled drain hose clip and drain hose according to an exemplary embodiment of the invention.

Next, the drain hose clip 10 is aligned with the cutout or opening 408 in the rear panel 406 of the washer 400 and pushed into the opening 408 until the drain hose clip 10 snaps and locks in place, for example, by the locking tabs 316A, 316B engaging a portion of the cutout or opening 408 of the rear panel 406, as illustrated in FIG. 12. In other embodiments, the drain hose clip 10 can be configured to be inserted into the opening 408 in the housing, for example, from the interior side or from the exterior side of the rear panel 406, or in other embodiments, from both the interior and exterior side of the rear panel 406, for example, if the drain hose clip 10 is formed from separate pieces. In this manner, the drain hose clip 10 fixedly secures the drain hose 100 to the rear panel 406 and controls the orientation of the drain hose 100 with respect to the rear panel 406 and the other components of the washer 400, such as the drain pump 200.

Figure 14:
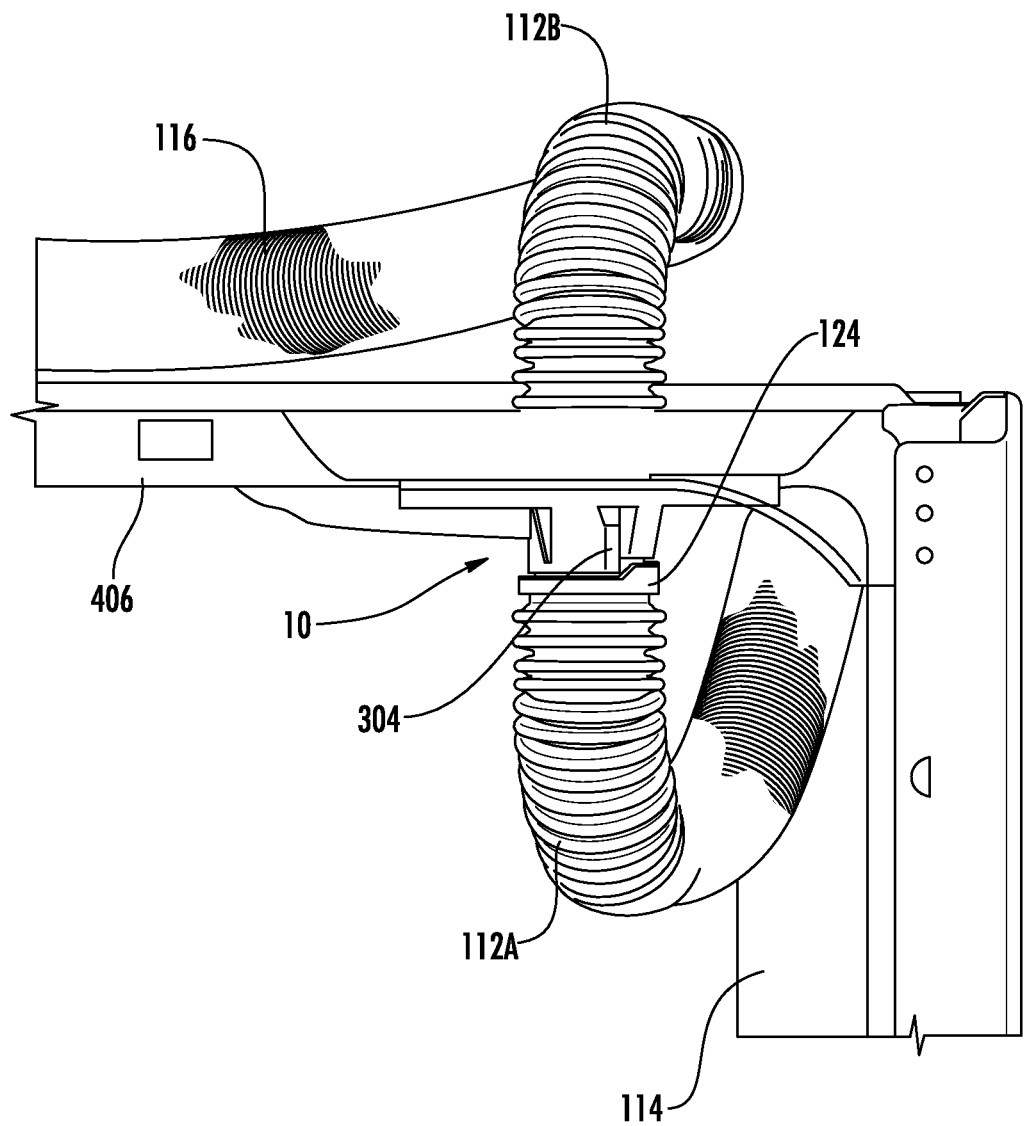
FIG. 14 is a partial top assembly view of a rear panel of a washer housing and an assembled drain hose clip and drain hose according to an exemplary embodiment of the invention.

As illustrated in FIG. 14, the flange 310A can be configured to extend a greater distance from the surface of the portion 302A of the drain hose clip 10 than the flange 310B extends from the portion 302B of the drain hose clip 10. In the orientation feature 304, which is formed on the end of the flange 310A can engage the corresponding orientation feature 124 of the drain hose 100 to control the origination of the drain hose 100.

Figure 16:
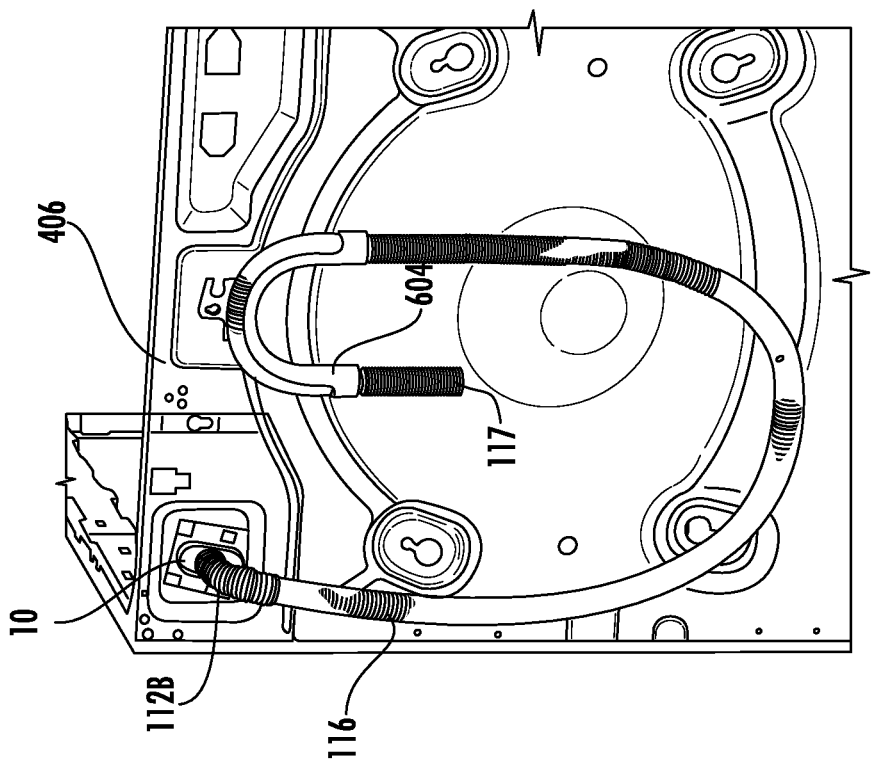
FIG. 16 is another partial rear perspective view of an exterior of a rear panel of a washer housing and an assembled drain hose clip and drain hose according to an exemplary embodiment of the invention.
Figure 15:
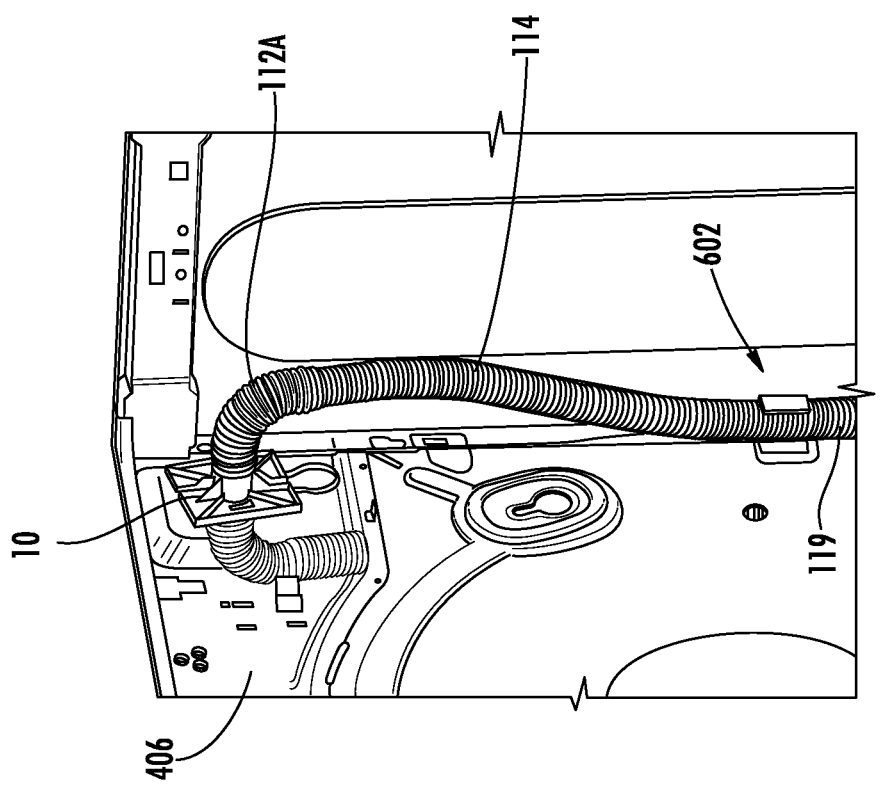
FIG. 15 is a partial front perspective view of an interior of a rear panel of a washer housing and an assembled drain hose clip and drain hose according to an exemplary embodiment of the invention.

As illustrated in FIG. 15, the drain hose 100 can then be secured to the inside of the rear panel 406 of the housing, for example, a side panel clip 602 or the like. Next, the drain hose 100 can be routed and secured to the rear panel 406 of the housing at a second location using another hose clip or hose support 604 or the like, as shown in FIG. 16. The drain hose 100 can remain in this secured state during packaging and shipping to prevent damage to the drain hose 100. After the washer is delivered to a user and the packaging is removed, the user simply can remove the second open end 117 of the drain hose 100 from the second hose clip or support 604 and position the second open end 117 (distal end) of the drain hose 100 into an external drain pipe (not shown) to complete the installation of the drain hose 100.

Figure 18:
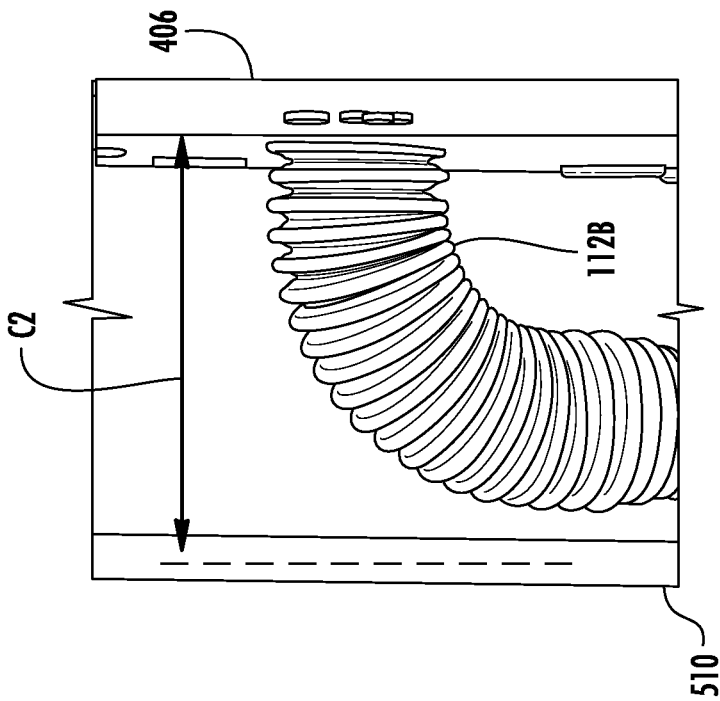
FIG. 18 is a partial side view of an exterior of a rear panel of a washer housing and a drain hose according to an exemplary embodiment of the invention.
Figure 17:
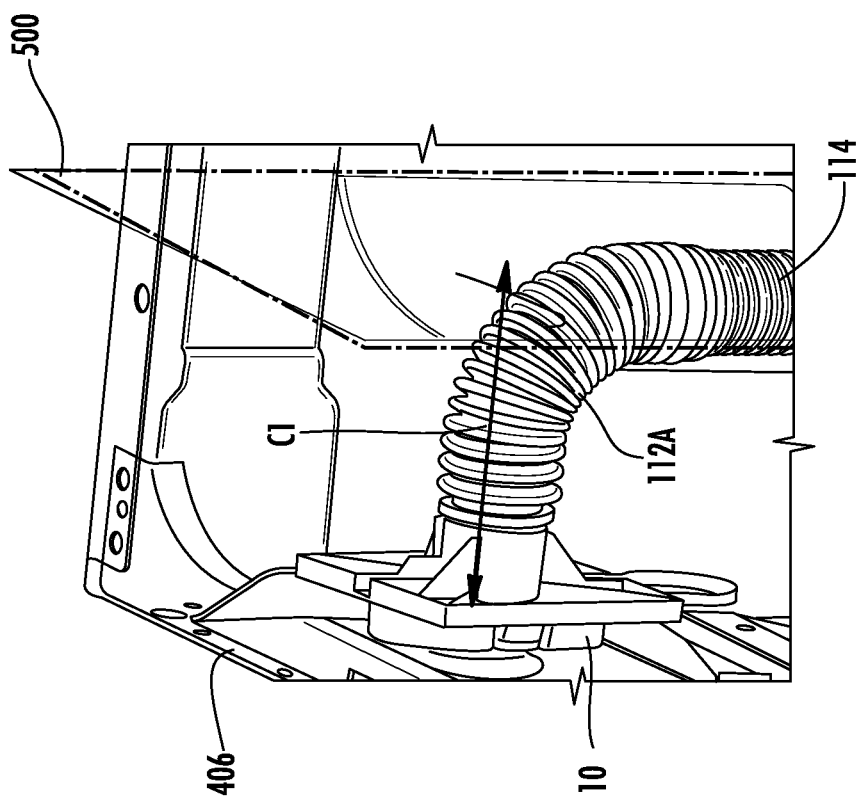
FIG. 17 is a partial side perspective view of an interior of a rear panel of a washer housing and an assembled drain hose clip and drain hose according to an exemplary embodiment of the invention.

With reference to FIGS. 17 and 18, the drain hose 100 can be bent substantially 90~180 degrees (or more) at the flex-sections 112A, 112B such that the drain hose 100 extends along the inside and outside of the rear panel 406 of the housing. By providing the exemplary assembly of the drain hose clip 10 and the drain hose 100 having a flex-section, or a double-flex section 112, the drain hose 100 can be assembled in an area inside the housing of washer having limited space (e.g., clearance C1) between the rear panel 406 and a plane 500 corresponding to adjacent internal components. The exemplary assembly of the drain hose clip 10 and the drain hose 100 also enables the drain hose 100 to be routed on the outside of the rear panel 406 of the washer housing within a limited space (e.g., clearance C2) between the rear panel 406 and the packaging 510 for shipping the washer.

With reference again to FIGS. 4B, 7A-7C, and 12-15, at a subsequent pump station of the assembly line, an operator will work from the front of the washer 400 and in an area close to the bottom portion of the front panel 407 for assembly tasks. Since the operator at the pump station is working from the front of the appliance, this operator cannot reach or access very far into the interior of the appliance to work on any assemblies in the rear area of the appliance. As a result of this and the length of the continuous one-piece drain hose 100, the drain hose 100 is fed or inserted through the opening or cutout 408 in the rear panel 406 (e.g., at an upper portion of the rear panel) by the operator at the rear panel station on the assembly line and prior to the washer 400 arriving at the pump station of the assembly line. By coupling the drain hose 100 to the rear wall 406 using the exemplary drain hose clip 10, the orientation of the drain hose with respect to the fitting 202 of the drain pump 200 is assured and the drain hose 100 can be easily and efficiently coupled to the drain pump. The opening section 122 of the drain hose 100 is aligned with the corresponding projection or key portion 204 on the fitting 202 of the drain pump and the lock tab 121 is aligned with corresponding cutout 203 on the fitting 202 of the drain pump 200 to facilitate a proper connection of the drain hose 100 to the drain pump 200, thereby ensuring a correct assembly of the drain hose 100 to the drain pump 200 by the operator.

In this manner, the exemplary embodiment of a drain hose clip 10 having an orientation control feature can control and maintain the correct alignment of the drain hose 100 for assembly with the drain pump 200 by the operator at the subsequent pump station of the assembly line. The drain hose clip 10 can reduce or prevent any need for the operator to force, twist, or bend the drain hose 100 into correct alignment with the drain pump 200, thereby reducing or preventing damage to the drain hose 100, such as kinking, stress marks or cracks, or other damage or accelerated wear resulting from portions of the drain hose 100 being moved into, or springing into, contact with internal components of the appliance, such as the oscillating or suspension systems of the appliance.

The exemplary drain hose clip 10 also can ensure that the drain hose 100 is easily and efficiently secured and fixedly aligned with the opening or cutout in the rear panel 406 of the washer 400. In this manner, the drain hose clip 10 can reduce or prevent misalignment of the drain hose 100 resulting, for example, from bending of the drain hose 100 during the assembly, packaging, or shipping processes, thereby reducing or preventing misalignment, accelerated wear, or damage to the drain hose 100.

The drain hose clip 10 can control the orientation of the drain hose 100 and the drain hose clip 10 with respect to each other, as well as to the opening or cutout 408 in the rear panel 407 of the washer 400. The drain hose clip 10 also can reduce or prevent movement of the drain hose 100 into and out of the opening 408 in the rear panel 406 of the washer 400, thereby reducing or preventing damage from the drain hose 100 rubbing against the housing or the opening of the housing, for example, during operation of the washer 400.

Another exemplary embodiment can include a drain hose clip (e.g., 10) for securing a drain hose (e.g., 100) to a household appliance, such as a washer (e.g., 400). The drain hose clip (e.g., 10) includes a body (e.g., 12A, 12B, 302A, 302B, etc.) configured to be coupled to the drain hose (e.g., 100) and to secure the drain hose (e.g., 100) to the household appliance (e.g., 400), orientation control means (e.g., 14, 16, 304, and/or 306, etc.) for engaging a corresponding orientation control feature (e.g., 124, 126) on the drain hose (e.g., 100) and maintaining a fixed position of the drain hose (e.g., 100) with respect to the body (e.g., 12A, 12B, 302A, 302B, etc.) of the drain hose clip (e.g., 10); and securing means (e.g., 22A, 22B, 312A, 312B, etc.) for securing the drain hose clip (e.g., 10) to the household appliance (e.g., 400).

Another exemplary embodiment can include a household appliance (e.g. 400) including a housing having a front panel (e.g., 407) and a rear panel (e.g., 406), the housing (e.g., 402) having a door (e.g., 404) formed in the front panel (e.g., 407) for accessing an interior of the housing (e.g., 402), the housing (e.g., 402) having a cutout (e.g., 408) in the rear panel (e.g., 400); a tub (e.g., 405) disposed inside the housing (e.g., 402); a rotatable drum within the tub (e.g., 405), the rotatable drum for receiving laundry through the door (e.g., 404); a drain pump (e.g., 200) disposed inside the housing (e.g., 402); a continuous drain hose (e.g., 100) having a first open end (e.g., 115) coupled to the drain pump (e.g., 200) and a second open end (e.g., 117) disposed outside of the housing (e.g., 402), wherein the drain hose (e.g., 100) extends through the cutout (e.g., 408) in the rear panel (e.g., 406); and a drain hose clip (e.g., 10) including a body (e.g., 12A, 12B, 302A, 302B, etc.) configured to be coupled to the drain hose (e.g., 100) and to secure the drain hose (e.g., 100) to the household appliance (e.g., 400); orientation control means (e.g., 14, 16, 304, and/or 306, etc.) for engaging a corresponding orientation control feature (e.g., 124, 126) on the drain hose (e.g., 100) to maintain a fixed position of the drain hose (e.g., 100) with respect to the body (e.g., 12A, 12B, 302A, 302B, etc.) of the drain hose clip (e.g., 10); and securing means (e.g., 22A, 22B, 312A, 312B, etc.) for securing the drain hose clip (e.g., 10) to the household appliance (e.g., 400), wherein the drain hose clip (e.g., 10) engages the drain hose (e.g., 100) and the cutout (e.g., 408) in the rear panel (e.g., 406) to secure the drain hose (e.g., 100) to the cutout (e.g., 408) and control an orientation of the drain hose (e.g., 100) with respect to the drain pump (e.g., 200).

The present invention has been described herein in terms of several exemplary embodiments. However, modifications and additions to these embodiments will become apparent to those of ordinary skill in the art upon a reading of the foregoing description and could be made without departing from the scope of the invention.

What is claimed is:

1. A drain hose clip for securing a drain hose to a household appliance, the drain hose clip comprising:
    a body configured to be coupled to the drain hose and to secure the drain hose to the household appliance, the body having an opening for encircling and securing a part of the drain hose; and
    an orientation control feature formed on the body and configured to engage a corresponding orientation control feature formed on the drain hose and to restrict a coupling of the drain hose clip to only a single circumferential and axial position on the drain hose, the orientation control feature including at least one of a flange, a tab, and a projection extending from the body in an axial direction of the opening.

2. The drain hose clip of claim 1, wherein the body includes:
    a first portion; and
    a second portion removably coupled to the first portion and cooperating to form the opening for encircling and securing the part of the drain hose;
    wherein the orientation control feature is formed on one of the first portion and the second portion.

3. The drain hose clip of claim 2, wherein the orientation control feature is formed on the first portion and the second portion.

4. The drain hose clip of claim 2, wherein the first portion is a separate part from the second portion.

5. The drain hose clip of claim 2, wherein the first portion is moveably coupled to the second portion.

6. The drain hose clip of claim 2, further comprising:
    a connecting strip that moveably connects the first portion and second portion.

7. The drain hose clip of claim 2, wherein the first portion is snap-fit to the second portion.

8. The drain hose clip of claim 2, wherein one of the first portion and the second portion includes an orientation feature that engages a corresponding orientation feature on the drain hose.

9. The drain hose clip of claim 8, wherein the orientation feature is arranged such that the drain hose can be coupled to the drain hose clip in only a single position.

10. The drain hose clip of claim 2, wherein the first portion includes a first orientation feature that engages a first corresponding orientation feature on the drain hose, and
    wherein the second portion includes a second orientation feature that engages a second corresponding orientation feature on the drain hose.

11. The drain hose clip of claim 2, wherein one of the first portion and the second portion includes a flange that engages and supports a portion of the drain hose.

12. The drain hose clip of claim 2, wherein the first portion includes a first flange that engages and supports a first portion of the drain hose, and
    wherein the second portion includes a second flange that engages and supports a second portion of the drain hose.

13. The drain hose clip of claim 2, wherein one of the first portion and the second portion includes a mating feature that engages a cutout in a wall of a housing of the household appliance.

14. The drain hose clip of claim 2, wherein the first portion includes a first mating feature that engages a cutout in a wall of a housing of the household appliance, and
    wherein the second portion includes a second mating feature that engages the cutout in the wall of the housing of the household appliance.

15. The drain hose clip of claim 14, wherein the first mating feature includes a first projection that engages a surface of the wall of the housing adjacent to the cutout and secures the drain hose clip to the wall, and
    wherein the second mating feature includes a second projection that engages the wall of the housing adjacent to the cutout and secures the drain hose clip to the wall.

16. The drain hose clip of claim 14, wherein the first mating feature includes a first alignment feature and the second mating feature includes a second alignment feature, and
    wherein the first alignment feature engages the second alignment feature to align the first mating feature and the second mating feature in a coupled state.

17. The drain hose clip of claim 14, wherein the first mating feature includes a first coupling feature and the second mating feature includes a second coupling feature,
    wherein the first coupling feature engages the second coupling feature to couple the first mating feature to the second mating feature.

18. The drain hose clip of claim 2, further comprising:
    a projection that engages a wall of a housing of the household appliance at a location adjacent to a cutout in the wall and secures the drain hose clip to the wall.

19. The drain hose clip of claim 2, wherein one of the first portion and the second portion includes one of a coupling feature and an alignment feature that engages another of the first portion and the second portion.

20. The drain hose clip of claim 2, wherein the first portion includes a first alignment feature and the second portion includes a second alignment feature, and wherein the first alignment feature engages the second alignment feature to align the first portion and the second portion in a coupled state.

21. The drain hose clip of claim 2, wherein the first portion includes a first coupling feature and the second portion includes a second coupling feature,
wherein the first coupling feature engages the second coupling feature to couple the first portion to the second portion.

22. The drain hose clip of claim 1, wherein the orientation control feature includes at least one projection formed on the body.

23. A household appliance comprising:
a housing having a front panel and a rear panel, the housing having a door formed in the front panel for accessing an interior of the housing, the housing having a cutout in the rear panel;
a tub disposed inside the housing;
a rotatable drum within the tub, the rotatable drum for receiving laundry through the door;
a drain pump disposed inside the housing;
a continuous drain hose having a first open end coupled to the drain pump and a second open end disposed outside of the housing, wherein the drain hose extends through the cutout in the rear panel; and
the drain hose clip of claim 1,
wherein the drain hose clip engages the drain hose and the cutout in the rear panel to secure the drain hose to the cutout and control an orientation of the drain hose with respect to the drain pump.

24. The household appliance of claim 23, wherein the household appliance is a washer.

25. The household appliance of claim 23, wherein the body of the drain hose clip includes:
a first portion; and
a second portion removably coupled to the first portion, the first portion and the second portion cooperating to form the opening that encircles and secures the part of the drain hose in a fixed position within the opening;
wherein one of the first portion and the second portion includes an orientation feature that engages a corresponding orientation feature on the drain hose to provide a predetermined orientation of the drain hose with respect to the drain hose clip in which the drain hose clip is restricted to only a single circumferential position on the drain hose.

26. The household appliance of claim 25, wherein the drain hose includes a straight portion interposing a first bending portion and a second bending portion,
wherein the straight portion is disposed in the cutout of the rear panel, and
wherein the straight portion is encircled and secured by the drain hose clip.

27. The household appliance of claim 26, wherein one of the first portion and the second portion includes a flange that engages and supports the straight portion of the drain hose.

28. The household appliance of claim 26, wherein the orientation control feature includes at least one projection formed on the body,
wherein the corresponding orientation control feature includes at least one projection formed on the straight portion of the drain hose, and
wherein the projection formed on the body engages the projection on the straight portion of the drain hose and restricts the drain hose clip to only the single circumferential position on the drain hose.

29. The household appliance of claim 25, wherein one of the first portion and the second portion includes a flange that engages and supports a portion of the drain hose.

30. The household appliance of claim 25, wherein one of the first portion and the second portion includes a mating feature that engages the cutout in the rear panel.

31. The household appliance of claim 30, wherein the mating feature includes a projection that engages a surface of the rear panel adjacent to the cutout, secures the drain hose clip to the rear panel, and prevents the drain hose clip from withdrawing from the cutout.

32. The household appliance of claim 25, wherein one of the first portion and the second portion includes one of a coupling feature and an alignment feature that engages another of the first portion and the second portion.

33. The household appliance of claim 23, wherein the drain hose clip includes a projection that engages a surface of the rear panel adjacent to the cutout, secures the drain hose clip to the rear panel, and prevents the drain hose clip from withdrawing from the cutout.

34. The household appliance of claim 23, wherein the orientation control feature includes at least one projection formed on the body,
wherein the corresponding orientation control feature includes at least one projection formed on the drain hose, and
wherein the projection formed on the body engages the projection on the drain hose and restricts the drain hose clip to only the single circumferential position on the drain hose.

35. A drain hose clip for securing a drain hose to a household appliance, the drain hose clip comprising:
a body configured to be coupled to the drain hose and to secure the drain hose to the household appliance;
orientation control means formed on the body for engaging a corresponding orientation control feature formed on the drain hose and for restricting a coupling of the drain hose clip to only a single circumferential position on the drain hose; and
securing means for securing the drain hose clip to the household appliance.

36. A household appliance comprising:
a housing having a front panel and a rear panel, the housing having a door formed in the front panel for accessing an interior of the housing, the housing having a cutout in the rear panel;
a tub disposed inside the housing;
a rotatable drum within the tub, the rotatable drum for receiving laundry through the door;
a drain pump disposed inside the housing;
a continuous drain hose having a first open end coupled to the drain pump and a second open end disposed outside of the housing, wherein the drain hose extends through the cutout in the rear panel; and
the drain hose clip of claim 35,
wherein the drain hose clip engages the drain hose and the cutout in the rear panel to secure the drain hose to the cutout and control an orientation of the drain hose with respect to the drain pump.

* * * * *